(12) United States Patent
Buescher

(10) Patent No.: US 10,870,345 B1
(45) Date of Patent: Dec. 22, 2020

(54) DRIVE APPARATUS

(71) Applicant: Hydro-Gear Limited Partnership, Sullivan, IL (US)

(72) Inventor: Ryan S. Buescher, Neoga, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 5 days.

(21) Appl. No.: 16/026,479

(22) Filed: Jul. 3, 2018

Related U.S. Application Data

(63) Continuation of application No. 15/876,957, filed on Jan. 22, 2018, which is a continuation of application No. 14/920,706, filed on Oct. 22, 2015, now Pat. No. 9,873,325.

(60) Provisional application No. 62/067,334, filed on Oct. 22, 2014.

(51) Int. Cl.
*B60K 17/10* (2006.01)
*F16H 47/02* (2006.01)
*F16H 57/10* (2006.01)

(52) U.S. Cl.
CPC ........... *B60K 17/105* (2013.01); *F16H 47/02* (2013.01); *F16H 57/10* (2013.01)

(58) Field of Classification Search
None
See application file for complete search history.

(56) References Cited

U.S. PATENT DOCUMENTS 3,421,547 A * 1/1969 Aslan .................... F16K 15/044
137/539
5,823,397 A * 10/1998 Gil .......................... B67D 3/045
222/181.3
6,185,936 B1 2/2001 Hauser et al.
6,390,227 B1 * 5/2002 Abend ................ A01D 34/6806
180/374
6,467,263 B2 10/2002 Johnson et al.
6,691,511 B1 * 2/2004 Phanco .............. B01D 35/0273
184/6.24
7,007,468 B1 * 3/2006 Bennett ..................... F04B 1/20
417/206

(Continued)

FOREIGN PATENT DOCUMENTS

WO WO2014127182 8/2014

OTHER PUBLICATIONS

U.S. Appl. No. 15/876,957, filed Jan. 22, 2018.

*Primary Examiner* — Michael Leslie
*Assistant Examiner* — Matthew Wiblin
(74) *Attorney, Agent, or Firm* — Neal, Gerber & Eisenberg LLP

(57) ABSTRACT

A check valve for use with a hydraulic drive apparatus includes a check ball disposed in a cage portion for engaging a valve seat to close the valve. The cage portion has a plurality of flexible ribs composed of a flexible material which permits the check ball to be inserted into to ball retaining area during assembly and to be retained in the ball area after assembly. A filter housing connected to a mounting member has a pair of openings formed in a first surface, and a pair of deformable lips surrounding each opening. A filter screen permits hydraulic fluid to enter a filter housing from a sump. A pair of check valves are disposed in a pair of check valve ports. An external surface of each check valve is engaged to one of the deformable lips to sealingly engage the check valve to the filter housing.

19 Claims, 27 Drawing Sheets

(56) References Cited

U.S. PATENT DOCUMENTS

| | | | | |
|---|---|---|---|---|
| 7,121,092 B1* | 10/2006 | Phanco | B60K 17/105 60/468 |
| 7,225,617 B1* | 6/2007 | Langenfeld | F16H 39/14 60/464 |
| 7,383,683 B1* | 6/2008 | Rawski | B60K 17/105 60/487 |
| 7,497,082 B1* | 3/2009 | Bennett | B60K 17/105 60/453 |
| 8,820,066 B1* | 9/2014 | Langenfeld | B60W 10/103 60/487 |
| 8,997,480 B1* | 4/2015 | Bennett | F16H 9/26 60/487 |
| 2002/0104314 A1* | 8/2002 | Johnson | F16H 39/14 60/454 |
| 2008/0178948 A1* | 7/2008 | Wilmshurst | F16K 15/04 137/513.5 |
| 2009/0178401 A1* | 7/2009 | Kline | B60K 17/105 60/487 |
| 2014/0373797 A1* | 12/2014 | Brand | F16K 15/04 123/90.38 |

* cited by examiner

DRIVE APPARATUS

CROSS-REFERENCE

This application is a continuation of U.S. patent application Ser. No. 15/876,957, filed on Jan. 22, 2018, which is a continuation of U.S. patent application Ser. No. 14/920,706, filed on Oct. 22, 2015, now U.S. Pat. No. 9,873,325, which claims the benefit of U.S. Provisional Pat. App. No. 62/067,334, filed on Oct. 22, 2014. All of these prior applications are incorporated by reference herein in their entirety.

BACKGROUND OF THE INVENTION

This application relates to a hydrostatic drive apparatus generally, and in particular, to a hydrostatic transaxle with a bypass mechanism and a brake mechanism. The transaxle is intended for use in driving a vehicle or other powered machine or apparatus.

SUMMARY OF THE INVENTION

An improved hydrostatic transaxle with a bypass mechanism and a brake mechanism is disclosed and described in detail herein. The transaxle can be mounted on a vehicle or other powered machine or apparatus to provide propulsion in cooperation with a prime mover.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
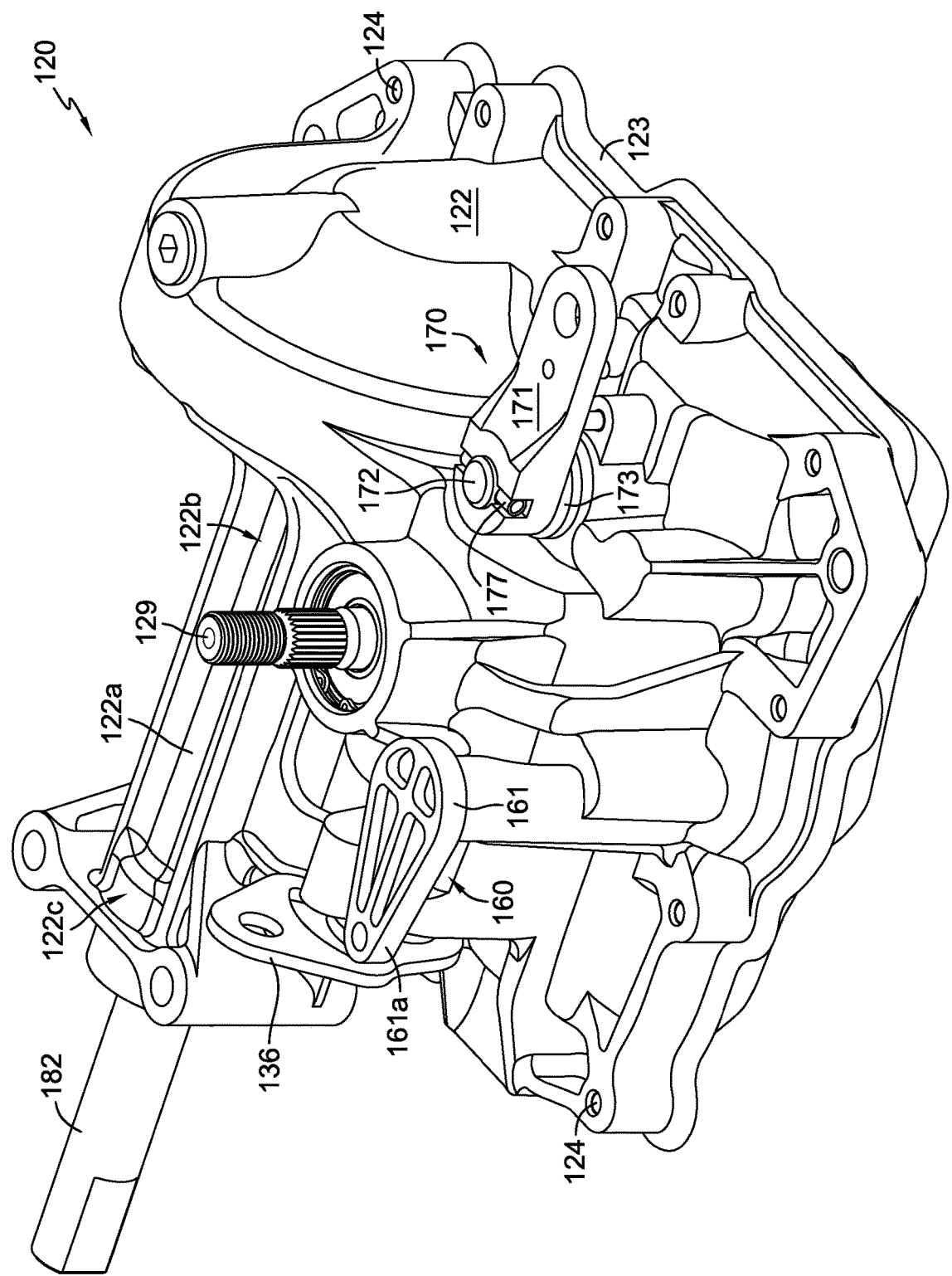
FIG. 1 is a perspective view of a first embodiment of a transaxle in accordance with the teachings herein.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles as taught herein and understood by one of ordinary skill in the art.

FIG. 1 shows a first embodiment of a hydrostatic transaxle 120. A housing cover 123 is secured to a main housing 122 with fasteners 124. An axle 182 extends from main housing 122 and is supported in an axle horn 122a at an inner bearing or journal location 122b and an outer bearing or bushing location 122c. A pump input shaft 129 also extends from main housing 122 and may have a pulley (not shown) fixed thereon capable of receiving a drive belt (not shown). A prime mover (not shown), such as an internal combustion engine or an electric motor, can supply motive force to the pump input shaft 129 of transaxle 120 by means of the belt and pulley combination. Transaxle 120 includes a block-lift bypass mechanism 160 having a bypass actuator 161 with an integrally-formed arm 161a extending from main housing 122. A control arm 136 that ultimately controls the rotational speed and direction of axle 182 is fixed to a trunnion arm 134 (depicted in FIGS. 2 and 4) that also extends from main housing 122.

FIGS. 2 to 5 depict a transmission 121 and a reduction gear set 180 of transaxle 120. Transmission 121 includes an axial piston pump 130 which hydraulically communicates with an axial piston motor 140 through porting having two separate passageways (not shown) formed in a center section 150. Center section 150 is secured in main housing 122 by fasteners 151. Pump input shaft 129 extends through an opening 135b in a swash plate 135 to the exterior of main housing 122. Pump input shaft 129 is rotatably supported in an input shaft bore 150i of center section 150 and is further supported by a bearing (not shown) seated in an input shaft opening 122f of main housing 122. A pump cylinder block 131 is engaged to pump input shaft 129. Pump cylinder block 131 has a set of pump pistons 131a axially disposed therein and runs on a pump running surface 150a of center section 150. Swash plate 135 controls the output of axial piston pump 130 in a known manner as a result of the arcuate motion of swash plate 135 when trunnion arm 134 is rotated by control arm 136. Alternatively, as is known, trunnion arm 134 may be rotated by other means, such as an electric actuator. This arcuate motion of swash plate 135 changes the angle of a pump thrust bearing 132, which is seated in swash plate 135, relative to the axial alignment of pump pistons 131a to impart reciprocal motion to pump pistons 131a when pump input shaft 129 and pump cylinder block 131 are rotationally driven by a prime mover (not shown), generating hydraulic fluid flow of variable displacement between axial piston pump 130 and axial piston motor 140.

A pair of guide ribs 135a formed on swash plate 135 engages a pair of guide grooves 122g formed in main housing 122 to guide the arcuate movement of swash plate 135. Guide ribs 135a also interface with a pair of notches 137a formed in a cradle bearing 137 to capture and move cradle bearing 137 along with swash plate 135. Cradle bearing 137 is in sliding contact with a cradle bearing mating surface 122h formed in main housing 122 to each side of guide grooves 122g. Pump input shaft 129 extends through an input shaft opening 137b in cradle bearing 137. Input shaft opening 137b is elongated similar to opening 135b to provide clearance around pump input shaft 129 when swash plate 135 is moved within its range of motion. In the illustrated embodiment, the centerlines of guide ribs 135a and corresponding guide grooves 122g all lie on a plane that intersects the rotational axis of pump input shaft 129.

Figure 5:
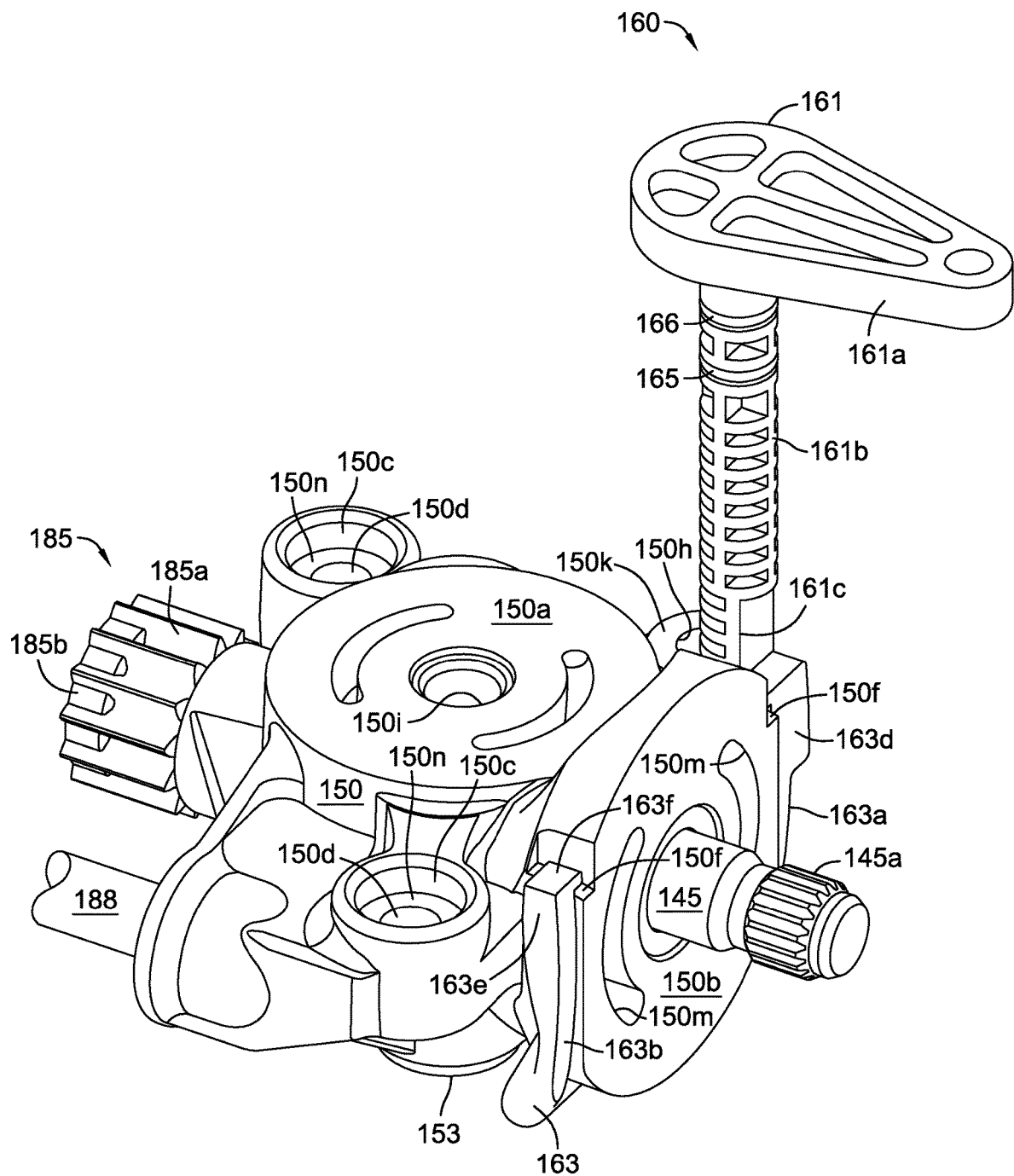
FIG. 5 is a perspective view of the portion of the transaxle shown in FIG. 4, with additional components removed for clarity.
Figure 6:
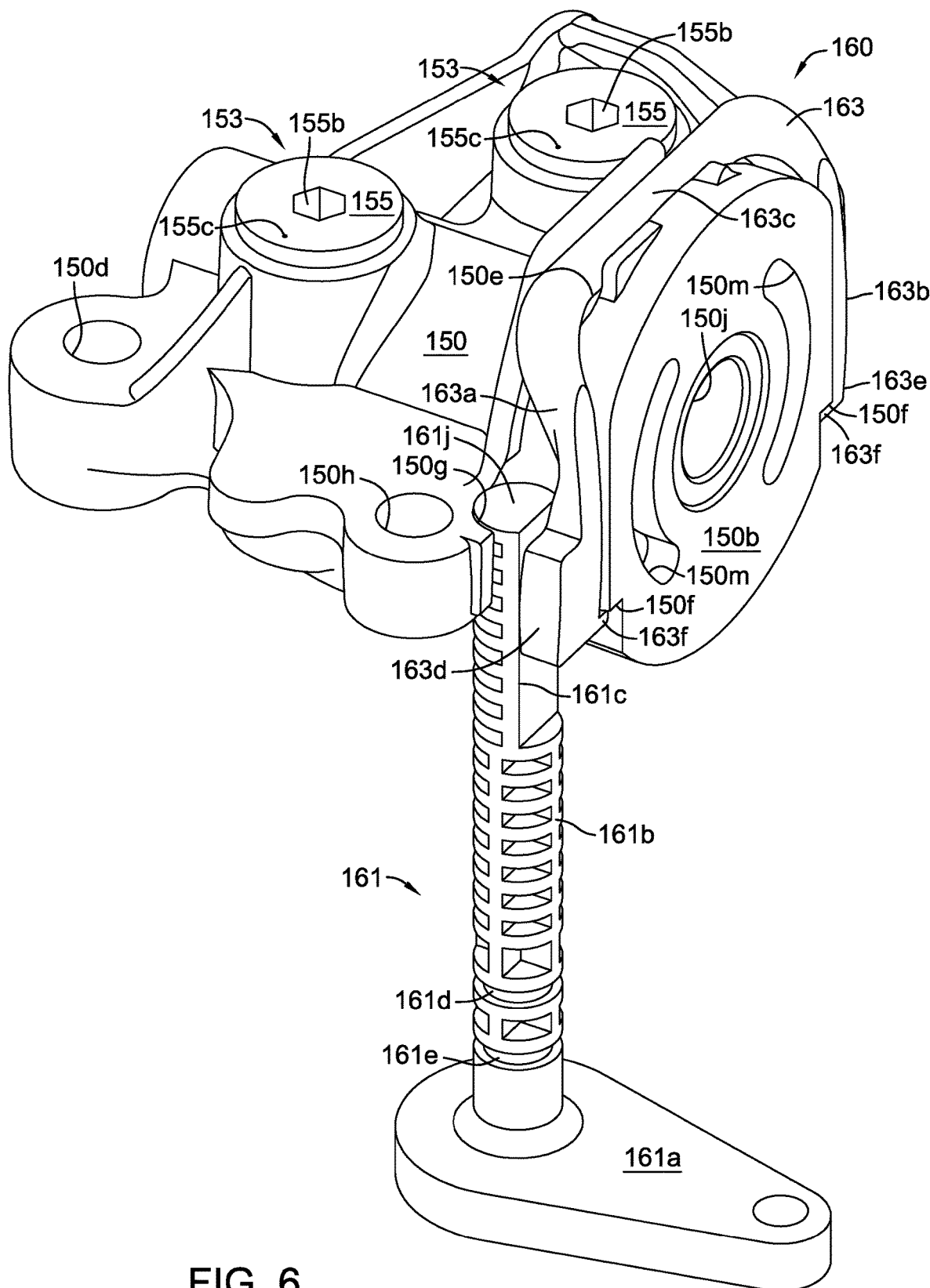
FIG. 6 is a perspective view of the portion of the transaxle shown in FIG. 5, rotated 180° about the axis of a motor output shaft, with additional components removed for clarity.

A motor cylinder block 141 of axial piston motor 140 has pistons 141a axially disposed therein and runs on a motor running surface 150b, which generally lies perpendicular to pump running surface 150a. The flow of hydraulic fluid from axial piston pump 130 into pistons 141a causes pistons 141a to bear against a motor thrust bearing 142. Because motor thrust bearing 142 is positioned at a fixed angle relative to the axial alignment of pistons 141a adjacent a motor displacement surface 122m formed in main housing 122, motor cylinder block 141 is urged to rotate. Motor cylinder block 141 is slidingly engaged to a motor output shaft 145 at a motor shaft first end 145a via splines or the like and causes motor output shaft 145 to rotate. Reduction gear set 180 is engaged to motor output shaft 145 at a motor shaft second end 145b and is driven thereby. Motor output shaft 145 is rotatably supported solely by center section 150 in a cylindrical bore 150j as shown in FIGS. 5 and 6. Bearings or the like (not shown) can be employed in cylindrical bore 150j if needed.

A hydraulic circuit exists between axial piston pump 130 and axial piston motor 140 that is normally closed during operation of transaxle 120 with the exception of make-up hydraulic fluid from a sump 115, which can enter the circuit through a valve opening 155b formed in a threaded plug 155 of one of a set of check valves 153 installed in center section 150 as shown in FIG. 6. Each check valve 153 contains a bleed passage 155c in threaded plug 155 to reduce the harshness or immediacy of the transaxle's response to operator inputs at control arm 136, improving the ride quality of any vehicle equipped with transaxle 120. Check valves 153 communicate with the internal porting (not shown) of center section 150 by allowing make-up hydraulic fluid to be drawn through the check valve 153 that communicates with the low pressure or suction side of the hydraulic circuit, which may be one or the other of check valves 153 depending upon the direction of fluid circulation between axial piston pump 130 and axial piston motor 140, thereby compensating for fluid losses during operation. A filter, substantially similar to the filter 356 depicted in FIG. 10, can be attached to center section 150 in a known manner to remove contaminants from the hydraulic fluid entering through check valves 153, if needed, to extend the service life of transaxle 120.

Figure 2:
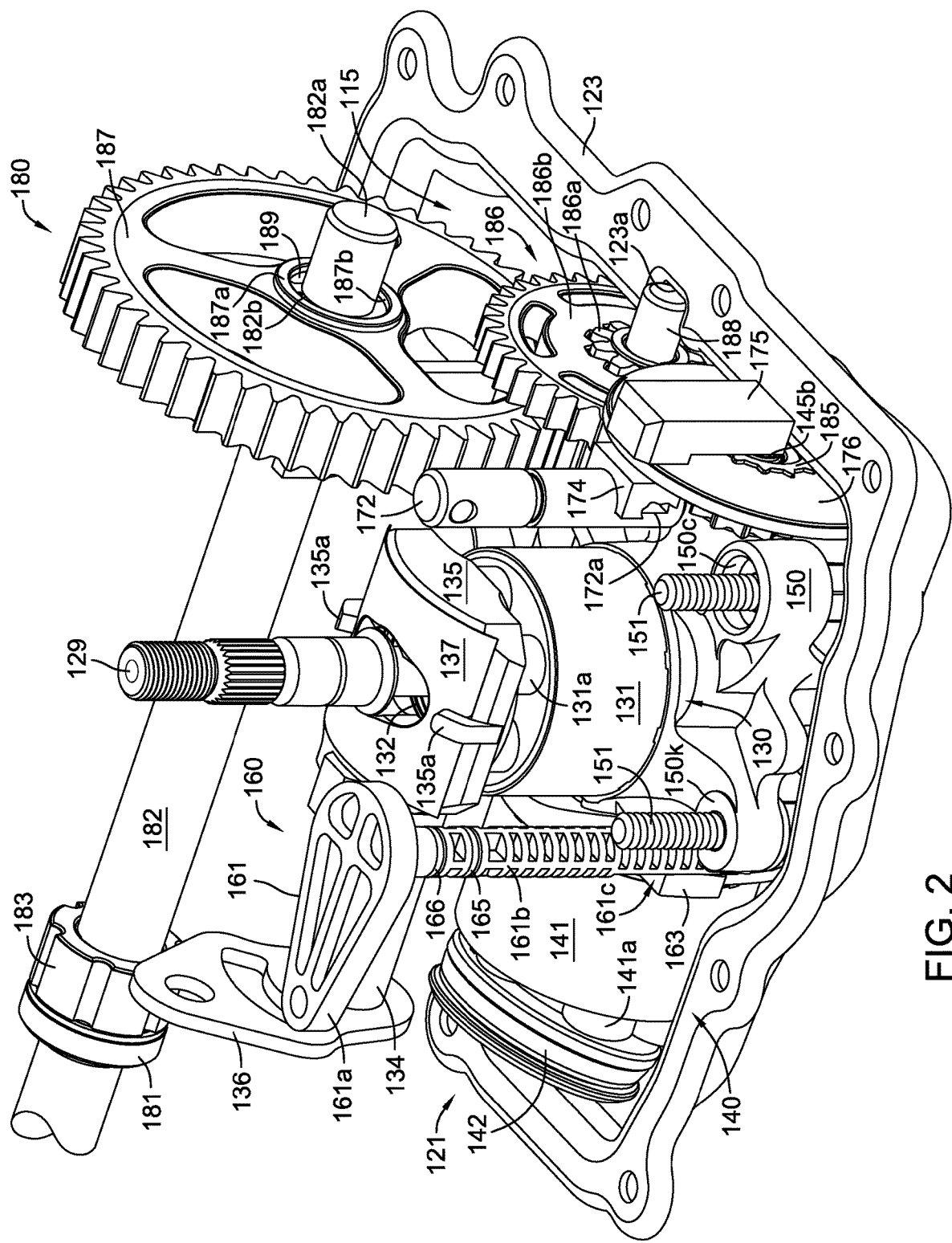
FIG. 2 is a perspective view of a portion of the transaxle shown in FIG. 1, with certain components removed for clarity.

Reduction gear set 180 includes a pinion gear 185 shown in FIGS. 2 and 5 supported on and driven by motor output shaft 145, a combination gear 186 having an inner gear 186a drivingly engaged to an outer gear 186b, and a final drive gear 187. Combination gear 186 is supported on a jack shaft 188 that is supported at one end by center section 150. Jack shaft 188 is supported at its opposite end at the housing joint by support pockets 122s and 123a formed in main housing 122 and housing cover 123, respectively. Final drive gear 187 is supported on and drives axle 182.

Axle 182 is journalled in axle horn 122a at inner bearing location 122b and is supported by an axle bushing 183 at outer bearing location 122c. As shown in FIG. 2, axle bushing 183 includes fluid grooves and, additionally, fluid grooves (not shown) are formed inside axle horn 122a through the journal area alongside axle 182 to allow sump fluid distribution throughout axle horn 122a, including lubrication of an axle seal 181. Optionally, bearings or bushings or a combination of known bearing and bushing components can be used at inner bearing location 122*b* and outer bearing location 122*c*.

Figure 3:
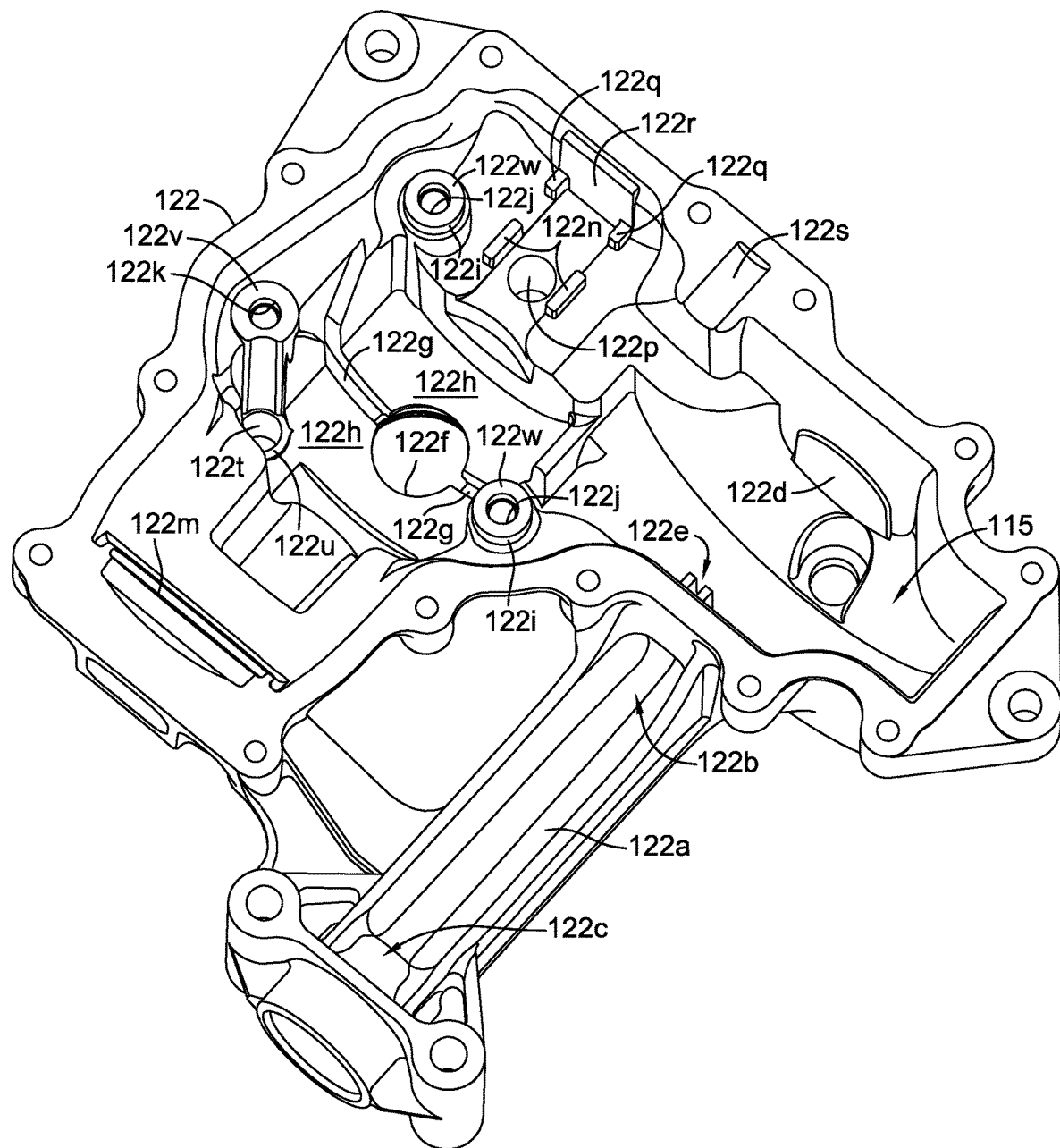
FIG. 3 is a perspective view of the main housing of the transaxle of FIG. 1.

During assembly, axle 182 is installed through axle horn 122*a* and through a splined hub 187*a* of final drive gear 187 such that an inner end 182*a* of axle 182 is positioned adjacent a thrust surface 122*d* formed on main housing 122, as best shown in FIG. 3. Then, a C-clip 189 is installed in a groove 182*b* formed on axle 182. Although other types of retaining clips other than C-clip 189 could be used in this assembly, C-clip 189 simply slides into groove 182*b* and can therefore be installed without using a tool. Final drive gear 187 is then moved axially along a set of splines 182*c* of axle 182 (as depicted in FIG. 4) toward axle thrust surface 122*d* so that C-clip 189 is nested and retained in a C-clip recess 187*b* formed in splined hub 187*a*.

Figure 4:
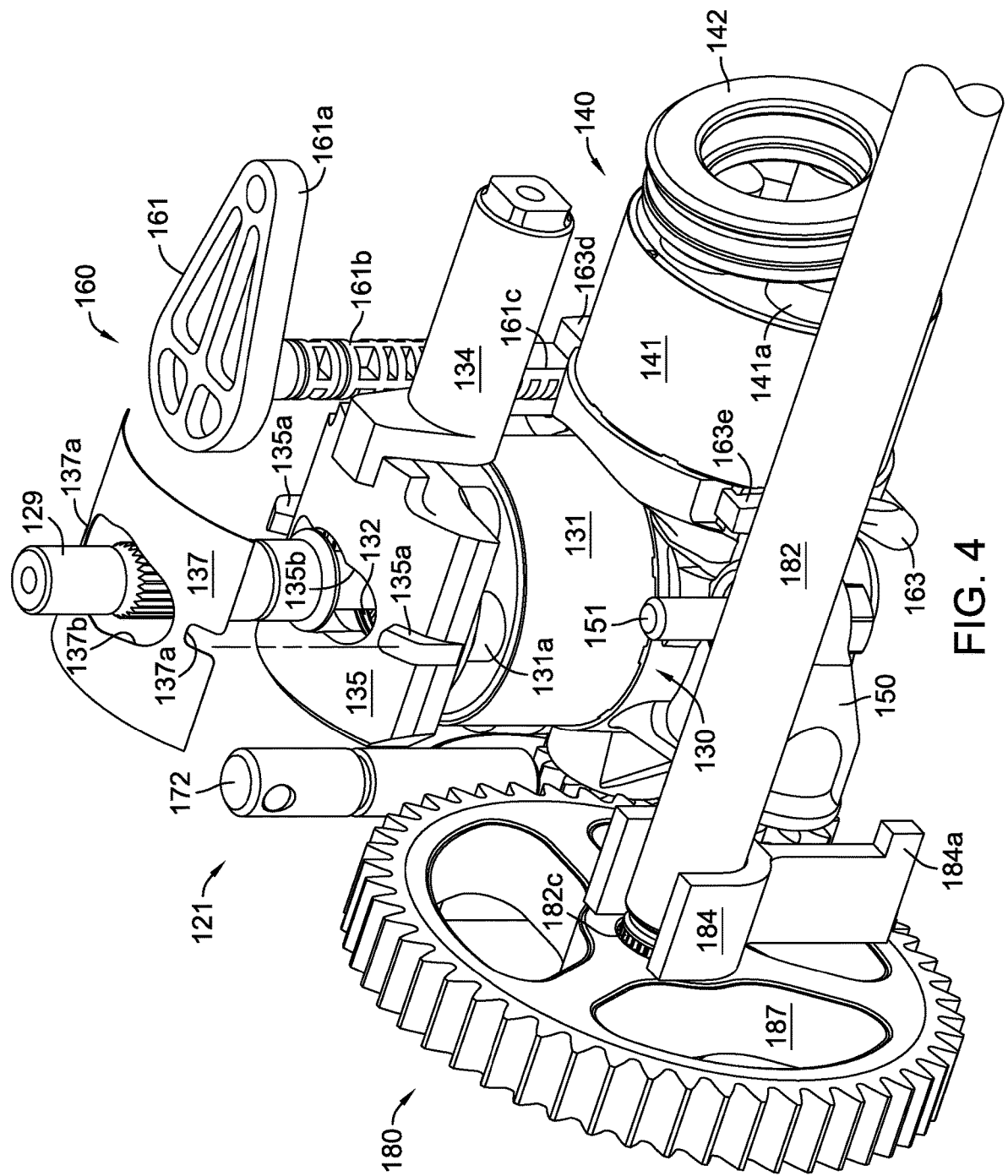
FIG. 4 is a perspective view of the portion of the transaxle shown in FIG. 2, rotated 180° about the axis of a pump input shaft, with additional components removed for clarity.

Shown in FIG. 4, a gear spacer 184 is then installed between final drive gear 187 and main housing 122 adjacent the side of final drive gear 187 opposite C-clip recess 187*b* so that C-clip 189 remains nested and retained in C-clip recess 187*b*. An extension 184*a* of gear spacer 184 engages a spacer anti-rotation feature 122*e* depicted as a slot formed in main housing 122 to prevent rotation of gear spacer 184. Through this arrangement of components, final drive gear 187 is properly positioned, axial movement of final drive gear 187 is restricted in both directions, axle 182 is retained in main housing 122, and axial movement of axle 182 is restricted in both directions.

As shown in FIGS. 3 and 5, mating features formed on center section 150 and main housing 122 ensure proper orientation of center section 150 at installation. Specifically, two alignment pockets 150*c* formed concentrically about a first and a second center section fastener opening 150*d* mate with two pilot bosses 122*i* formed concentrically about threaded pockets 122*j* to establish X-Y positioning of center section 150 in main housing 122. Planar mating surfaces 150*n* and 122*w* of these same two alignment pockets 150*c* and two pilot bosses 122*i* establish a Z axis position of center section 150. A third set of planar mating surfaces 150*k* and 122*v*, formed on center section 150 and main housing 122, respectively, add mounting stability and further establish the Z axis position of center section 150 and ensure perpendicularity of pump running surface 150*a* to pump input shaft 129. Planar mating surfaces 150*n* and 150*k* are formed on center section 150 parallel to pump running surface 150*a*. The Z axis in this description is an axis parallel to or equivalent to the rotational axis of pump input shaft 129. A third center section fastener opening 150*h* is formed through planar mating surface 150*k*, and a mating threaded pocket 122*k* is formed through planar mating surface 122*v*. Three center section mounting fasteners 151 oriented parallel to the rotational axis of pump input shaft 129 are installed through two openings 150*d* and one opening 150*h* to engage two threaded pockets 122*j* and one threaded pocket 122*k*, respectively, to secure center section 150 to main housing 122.

Referring to FIGS. 3, 4, 5 and 6, block-lift bypass mechanism 160 allows axle 182 to freely rotate when hydrostatic transaxle 120 is not under power. This allows an operator of a vehicle equipped with hydrostatic transaxle 120 to freely move the vehicle without powering it up, e.g. when servicing the vehicle. A bypass actuator 161, comprising a bypass arm 161*a* and a bypass actuation rod 161*b*, extends into main housing 122 with bypass actuation rod 161*b* oriented generally parallel to pump input shaft 129. As shown, bypass arm 161*a* and bypass actuation rod 161*b* can be integrally formed portions of bypass actuator 161, though a separate arm and rod combination (not shown) may also be used in a known manner. O-ring grooves 161*d* and 161*e* are formed on actuation rod 161*b* to receive a retention O-ring 165 and a sealing O-ring 166, respectively. Sealing O-ring 166 prevents fluid leaks by sealing around actuation rod 161*b* in a conventional manner in an opening 122*t* formed in main housing 122. Retention O-ring 165 abuts an internal land 122*u* formed on main housing 122 to prevent outward movement of bypass actuator 161, thereby retaining bypass actuator 161 in main housing 122. This dual O-ring configuration allows bypass actuation rod 161*b*, with O-rings 165 and 166 installed thereon, to be inserted into main housing 122 through opening 122*t*. Upon insertion of bypass actuation rod 161*b*, retention O-ring 165 immediately retains bypass actuator 161 when it passes through opening 122*t*, thereby enabling simple assembly. Optionally, one or both of O-rings 165 and 166 can be integrally formed features of bypass actuation rod 161*b*, thereby further simplifying assembly.

Bypass actuation rod 161*b* is rotatably supported at its inner end 161*j* in a bypass rod pivot opening or cradle 150*g* of center section 150 as shown in FIG. 6. A U-shaped block-lift member 163 comprises a first block-lift leg 163*a* having a first formed end 163*d*, a second block-lift leg 163*b* having a second formed end 163*e*, and a pivot rod 163*c* connecting first block-lift leg 163*a* to second block-lift leg 163*b*. Motor running surface 150*b* is somewhat smaller than the diameter of motor cylinder block 141 to permit block lift member 163, and in particular block-lift leg 163*a* and second block-lift leg 163*b*, to contact motor cylinder block 141 at opposite sides of motor running surface 150*b*. Pivot rod 163*c* of block-lift member 163 is rotatably disposed in a pivot groove 150*e* of center section 150. A cam form 161*c* on the inner end 161*j* of actuation rod 161*b* is positioned adjacent to first formed end 163*d*; as illustrated in FIG. 6, block-lift bypass mechanism 160 is in a disengaged state. When bypass actuator 161 is rotated in either a clockwise or counterclockwise direction to initiate engagement of block-lift bypass mechanism 160, cam form 161*c* bears against first formed end 163*d*, thereby forcing block-lift member 163 to rotate about the axis of pivot rod 163*c*. A set of retention projections 163*f* formed on each of formed ends 163*d* and 163*e* interface with a pair of arcuate surfaces 150*f* formed on center section 150 to guide the rotation of block-lift member 163 while retaining pivot rod 163*c* in pivot groove 150*e*. When block-lift member 163 is rotated, first formed end 163*d* and second formed end 163*e* cooperatively contact and lift motor cylinder block 141 from motor running surface 150*b*, breaking hydraulic fluid communication between motor pistons 141*a* and fluid ports 150*m* formed in motor running surface 150*b*, and thus breaking the fluid communication between pump 130 and motor 140. Thus, motor output shaft 145, reduction gear set 180, and axle 182 are free to rotate without hydraulic resistance.

FIGS. 1, 2 and 3 best illustrate a brake mechanism 170. A brake shaft 172 is rotationally supported and sealed in an opening 122*p* formed in main housing 122. When brake shaft 172 is rotated either clockwise or counterclockwise, via corresponding rotation of a brake arm 171 from an initial position to a rotated position, a cam form 172*a* on brake shaft 172 forces a brake puck 174 against a brake rotor 176, which is mounted on pinion gear 185. Cam form 172*a* also acts as a slot to locate brake puck 174 and prohibit movement of brake puck 174 in an axial direction along the axis of rotation of brake shaft 172. Pinion gear 185 is mounted on motor shaft second end 145*b* of motor output shaft 145.

As shown in FIG. 5, pinion gear 185 has a drive gear portion 185a and a brake rotor mounting portion 185b. Brake rotor 176 is slidingly mounted on brake rotor mounting portion 185b of pinion gear 185. A second brake puck 175 is disposed in main housing 122 between brake rotor 176 and a thrust surface 122r formed on main housing 122. Inner puck locators 122n and outer puck locators 122q are formed on main housing 122 to help guide and retain brake pucks 174 and 175, respectively. As brake shaft 172 is rotated further, additional axial movement of brake puck 174 forces brake rotor 176 into frictional engagement with brake puck 175 as brake puck 175 is forced against thrust surface 122r, thereby braking motor output shaft 145. Additionally, brake puck 175 and thrust surface 122r cooperatively serve as thrust elements for motor output shaft 145 to limit the movement of motor output shaft 145 in a direction along its rotational axis. As indicated in FIG. 1, a spring 173 is disposed about brake shaft 172 between brake arm 171 and main housing 122, bearing against each to bias brake mechanism 170 to a disengaged state. The bidirectional nature of brake mechanism 170 permits an external brake linkage (not shown) to actuate brake mechanism 170 in either rotational direction.

Figure 7:
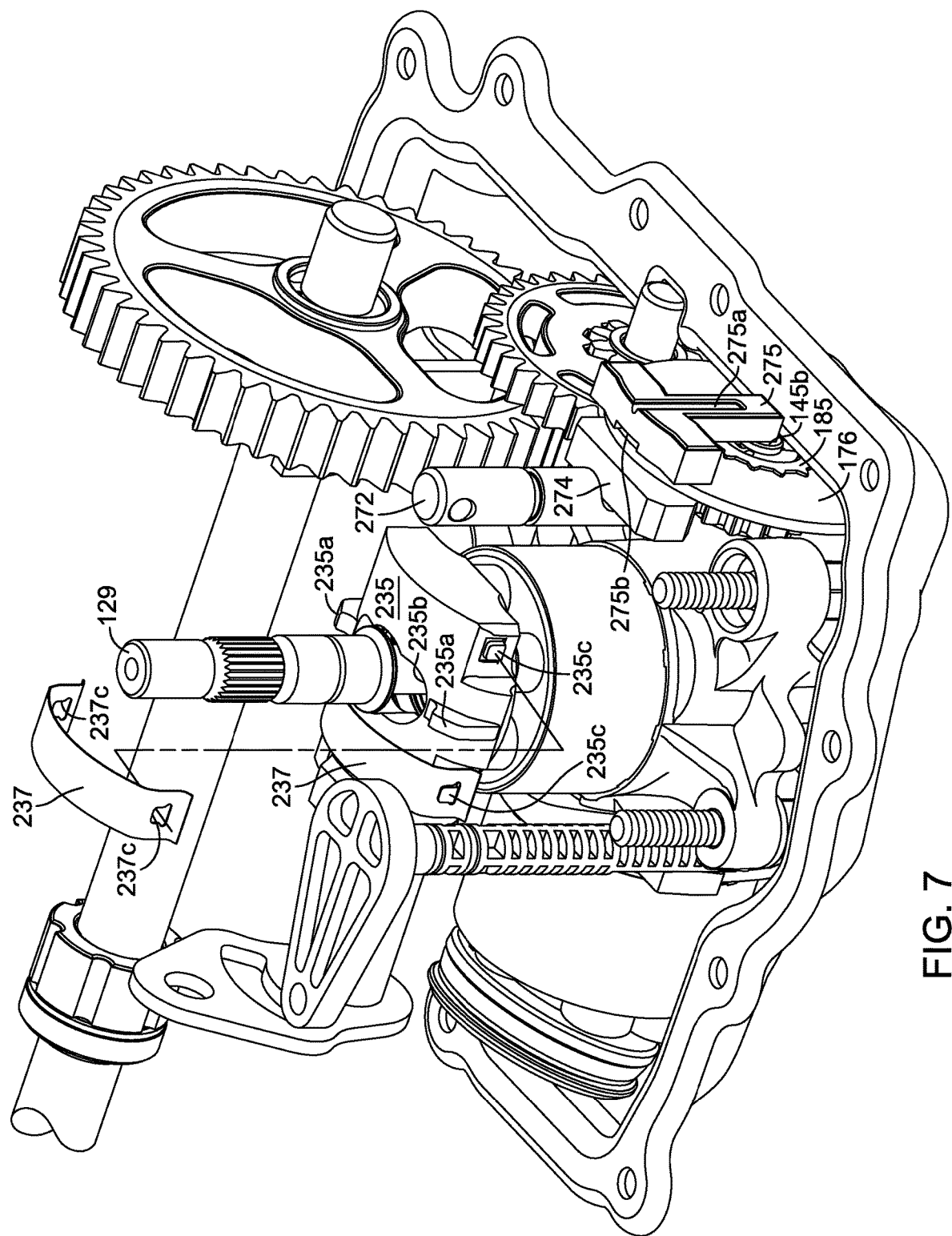
FIG. 7 is a perspective view of a portion of an alternate transaxle similar to the embodiment shown in FIG. 2, having alternate embodiments of cradle bearings, a swash plate, an inner brake puck and an outer brake puck.

An alternate brake puck embodiment is illustrated in FIG. 7. A brake shaft 272 with brake pucks 274 and 275 are arranged approximately the same as in the previously described configuration. When brake shaft 272 is rotated clockwise or counterclockwise, frictional braking is applied to brake rotor 176 as in previously described brake mechanism 170. Brake pucks 274 and 275, however, have a greater contact area with brake rotor 176 for improved braking efficiency and lower heat generation. Additionally, ease-of-installation grooves 275a and 275b are provided on T-shaped brake puck 275. Groove 275b provides clearance around motor shaft second end 145b during assembly while groove 275a engages a projection (not shown) formed on the transaxle main housing (not shown) that guides brake puck 275 into position during assembly and then properly positions brake puck 275 in relation to motor shaft second end 145b when brake puck 275 is fully installed.

An alternate swash plate embodiment in the form of a swash plate 235 and a pair of clip-on cradle bearings 237 is also illustrated in FIG. 7. Pump input shaft 129 extends through an opening 235b formed in swash plate 235. A pair of projections 235c formed on swash plate 235 engages a pair of openings 237c formed on each cradle bearing 237 such that cradle bearings 237 are locked in place on swash plate 235 to move along with swash plate 235. As in the first embodiment, the centerlines of a pair of guide ribs 235a and corresponding pair of guide grooves (not shown) formed in the transaxle main housing (not shown) all lie on a plane that intersects the rotational axis of pump input shaft 129.

FIGS. 8 through 12 depict an embodiment of a hydrostatic transaxle 320 that varies from the previously described embodiments in terms of the manner in which its bypass actuation rod 361b is retained in a main housing 322, and the manner in which its integral bypass arm 361a interacts with the main housing 322 to limit rotation of the bypass actuation rod 361b. Hydrostatic transaxle 320 also varies from the previously described embodiments in terms of the interaction of its main housing 322 and housing cover 323, the retention of cradle bearings 337 by its swash plate 335, a bushing retention feature (lip) 350w formed in the motor running surface 350b of its center section 350, additional support for loads induced at its jack shaft 388, and the details of its brake mechanism 370. The remaining components of hydrostatic transaxle 320 are substantially similar in form and function to those of the preceding hydrostatic transaxle embodiments and will not be further described herein.

Hydrostatic transaxle 320 comprises a housing cover 323 secured to a main housing 322 with fasteners 324. Integral locating pins 322x formed along the perimeter of main housing 322 interact with pin alignment openings 323b formed in housing cover flange 323c to minimize sealant smearing during the joining of main housing 322 and housing cover 323. Unless otherwise described herein, main housing 322 and housing cover 323 are substantially similar in form and function to main housing 122 and housing cover 123, respectively. An axle 382 extends from main housing 322 and is supported in an axle horn 322a at an inner bearing or journal location 322b and an outer bearing or bushing location 322c. A pump input shaft 329 also extends from main housing 322 and may have a pulley (not shown) fixed thereon capable of receiving a drive belt (not shown). A prime mover (not shown), such as an internal combustion engine or an electric motor, can supply motive force to the pump input shaft 329 of transaxle 320 by means of the belt and pulley combination. Transaxle 320 includes a block-lift bypass mechanism 360 having a bypass actuator 361 with an integrally-formed arm 361a extending from main housing 322. A control arm 336 that ultimately controls the rotational speed and direction of axle 382 is fixed to a trunnion arm 334 (depicted in FIGS. 9 and 11) that also extends from main housing 322.

Figure 11:
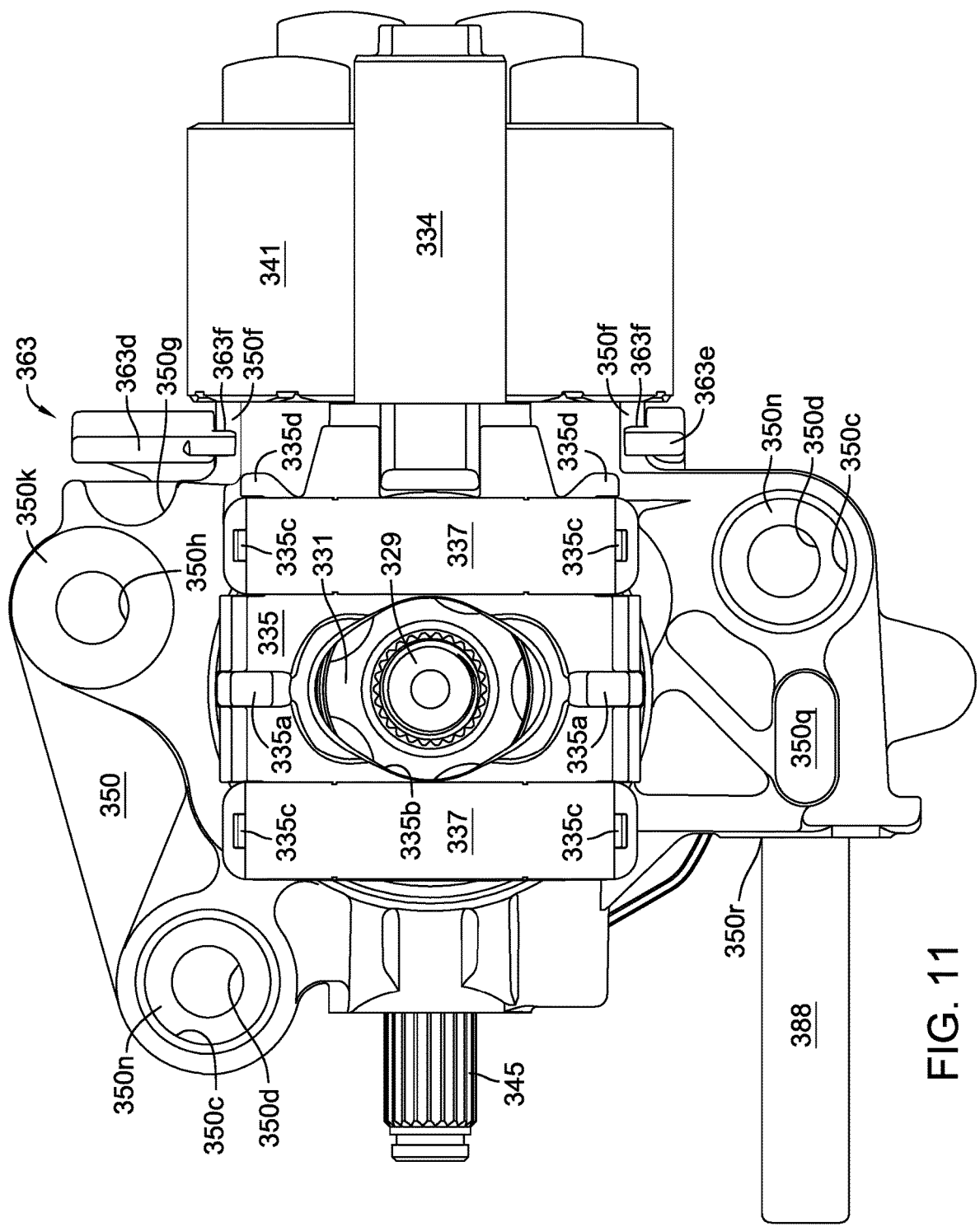
FIG. 11 is a top view of the portion of the transaxle shown in FIG. 10, rotated 90° about the axis of a pump input shaft, with additional components removed for clarity.
Figure 12:
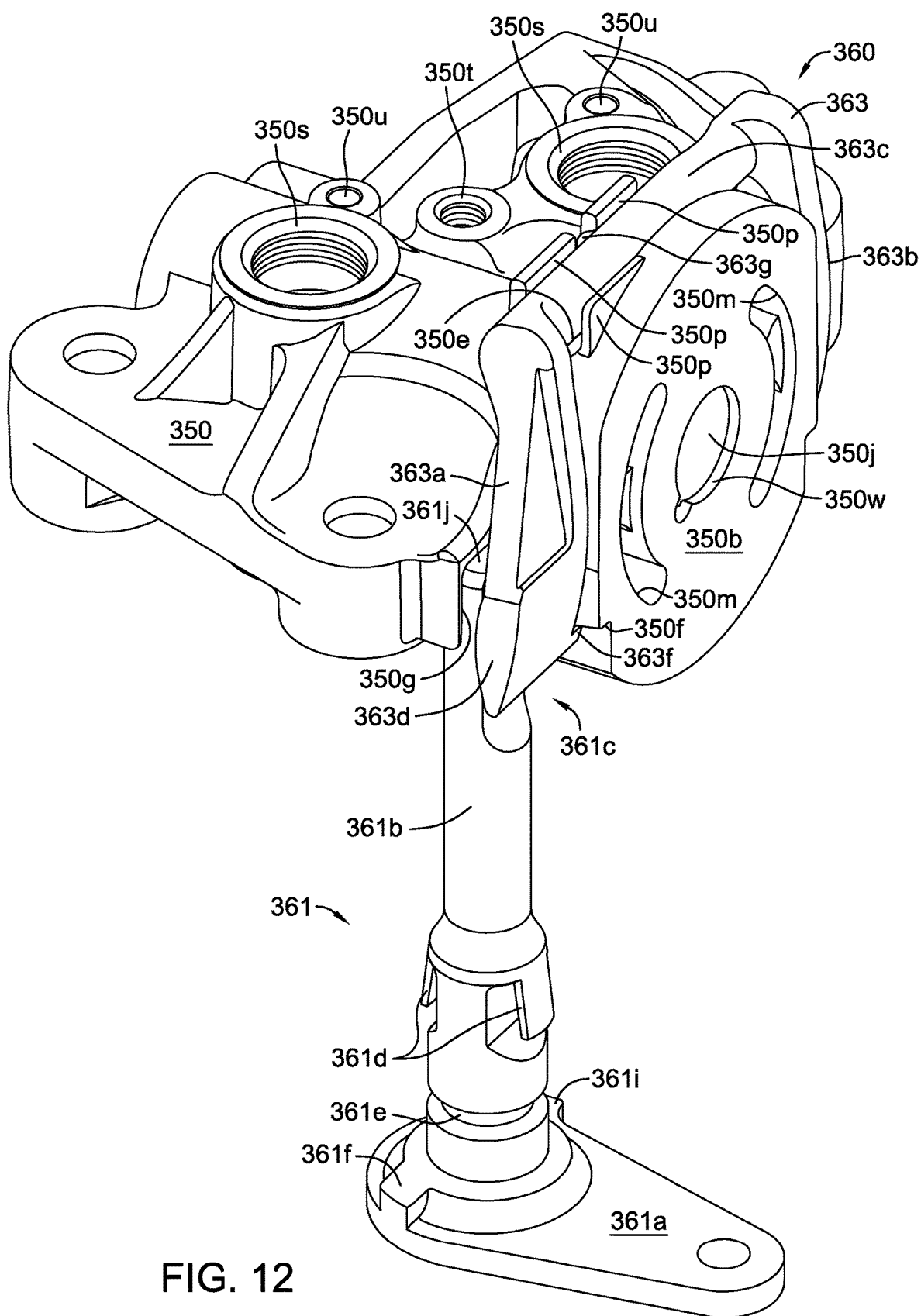
FIG. 12 is a perspective view of a portion of the transaxle shown in FIG. 8 with certain components removed for clarity.

Center section 350, shown in more detail in FIGS. 11 and 12, includes a pump running surface 350a and a motor running surface 350b formed on center section 350 generally perpendicular to each other. An axial piston pump 330 is disposed on the pump running surface 350a. A pump cylinder block 331 of axial piston pump 330 is engaged to and driven by pump input shaft 329. Pump cylinder block 331 has a set of pump pistons 331a axially disposed therein and runs on the pump running surface 350a of center section 350.

The interaction of the set of pump pistons 331a with a pump thrust bearing 332 disposed in swash plate 335 to create hydraulic displacement in response to arcuate movement of the swash plate 335 is as previously described for axial piston pump 130 and will not be further detailed herein. Similarly, a pair of guide ribs 335a formed on swash plate 335 engages a pair of guide grooves 322g formed in main housing 322 to guide the arcuate movement of swash plate 335 in the manner previously described for swash plates 135 and 235, respectively. Retention of each of a pair of clip-on cradle bearings 337 on the external, arcuate surface of swash plate 335 is accomplished through the interaction of a pair of projections 335c formed on swash plate 335 with a pair of openings 337c formed at opposing ends of cradle bearing 337 in the manner previously described for swash plate 235. However, swash plate 335 provides additional retention capability for the cradle bearing 337 disposed adjacent trunnion arm 334 through use of a pair of integrally-formed tabs 335d, as depicted in FIG. 11. As installed, cradle bearings 337 are placed in sliding contact with cradle bearing mating surfaces 322h formed adjacent opposing sides of guide grooves 322g in main housing 322. Overall, guide ribs 335a and the corresponding guide grooves 322g formed in main housing 322 each have a centerline that lies on a plane intersecting the rotational axis of pump input shaft 329.

A hydraulic motor 340 having an axial piston motor cylinder block 341 is disposed on motor running surface 350b. Motor cylinder block 341 has a set of pistons 341a axially disposed therein. Axial piston motor 340 is in fluid communication with axial piston pump 330 via porting having two separate passageways (not shown) formed in center section 350 between pump running surface 350a and motor running surface 350b. The flow of hydraulic fluid from axial piston pump 330 into pistons 341a causes pistons 341a to bear against a motor thrust bearing 342. Because motor thrust bearing 342 is positioned at a fixed angle relative to the axial alignment of pistons 341a adjacent a motor displacement surface 322m formed in main housing 322, motor cylinder block 341 is urged to rotate. Motor cylinder block 341 is slidingly engaged to motor output shaft 345 and causes motor output shaft 345 to rotate.

Motor output shaft 345 is rotationally supported in a cylindrical bore 350j of center section 350. A bushing retention lip 350w is integrally formed with motor running surface 350b to restrain axial movement of a bushing (not shown) pressed into cylindrical bore 350j that rotationally supports motor output shaft 345. At a first end (not shown), motor output shaft 345 is drivingly engaged to motor cylinder block 341. At a second end 345b, motor output shaft 345 engages pinion gear 385 to drive reduction gear set 380 and axle 382 in the manner previously described for reduction gear set 180 and axle 182, respectively, and will not be further detailed herein. Thus, the combination of axial piston pump 330, axial piston motor 340 and center section 350 forms a transmission 321 drivingly engaged to a reduction gear set 380 disposed in sump 315 that powers axle 382.

Referring to FIGS. 9, 10, 10A, and 11, center section 350 of transaxle 320 is oriented and mounted in main housing 322 in a manner substantially similar to that of center section 150, with the addition of a fourth set of planar mating surfaces 350q, 322aa formed on center section 350 and a strengthening rib 322bb of main housing 322, respectively, These respective surfaces cooperate to bear loads induced at the jack shaft pocket 350r formed in center section 350 that provides support to jack shaft 388 at a first end. This fourth set of planar mating surfaces 350q, 322aa also cooperates to establish a Z axis position, as defined below, of center section 350. It should be noted that jack shaft 388 is supported and captured at its second end by a pair of cooperating support pockets 322s, 323a formed in main housing 322 and housing cover 323, respectively, along the housing joint.

In the manner previously detailed for center section 150, two alignment pockets 350c formed concentrically about a first and a second center section fastener opening 350d mate with two pilot bosses 322i formed concentrically about threaded pockets 322j to establish X-Y positioning of center section 350 in main housing 322. The planar mating surfaces 350n, 322w of these same two alignment pockets 350c and two pilot bosses 322i, respectively, establish a Z axis position of center section 350. The Z axis in this description is an axis parallel to or equivalent to the rotational axis of pump input shaft 329. A third set of planar mating surfaces 350k, 322v formed on center section 350 and main housing 322, respectively, add mounting stability and further establish the Z axis position of center section 350. The planar mating surfaces 350n, 350k are formed on center section 350 parallel to pump running surface 350a, helping to ensure the perpendicularity of pump running surface 350a relative to pump input shaft 329. A third center section fastener opening 350h is formed through planar mating surface 350k, and a corresponding threaded pocket 322k is formed through planar mating surface 322v. Three center section mounting fasteners 351 oriented parallel to the rotational axis of pump input shaft 329 are installed through the center section fastener openings 350d, 350h to engage threaded pockets 322j, 322k, respectively, to secure center section 350 to main housing 322.

Figure 10:
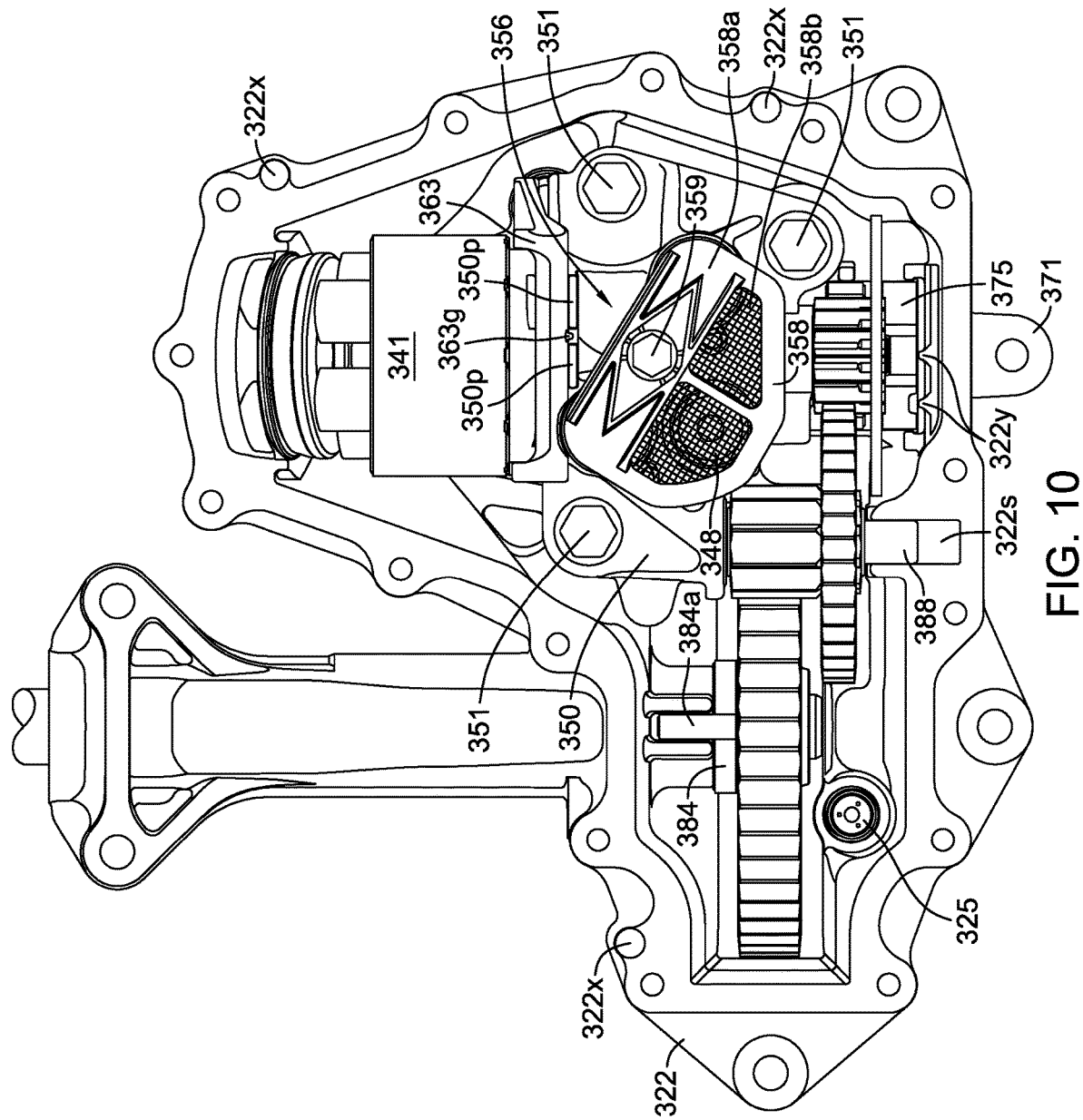
FIG. 10 is a bottom view of a portion of the transaxle shown in FIG. 8, with certain components removed for clarity.
Figure 13:
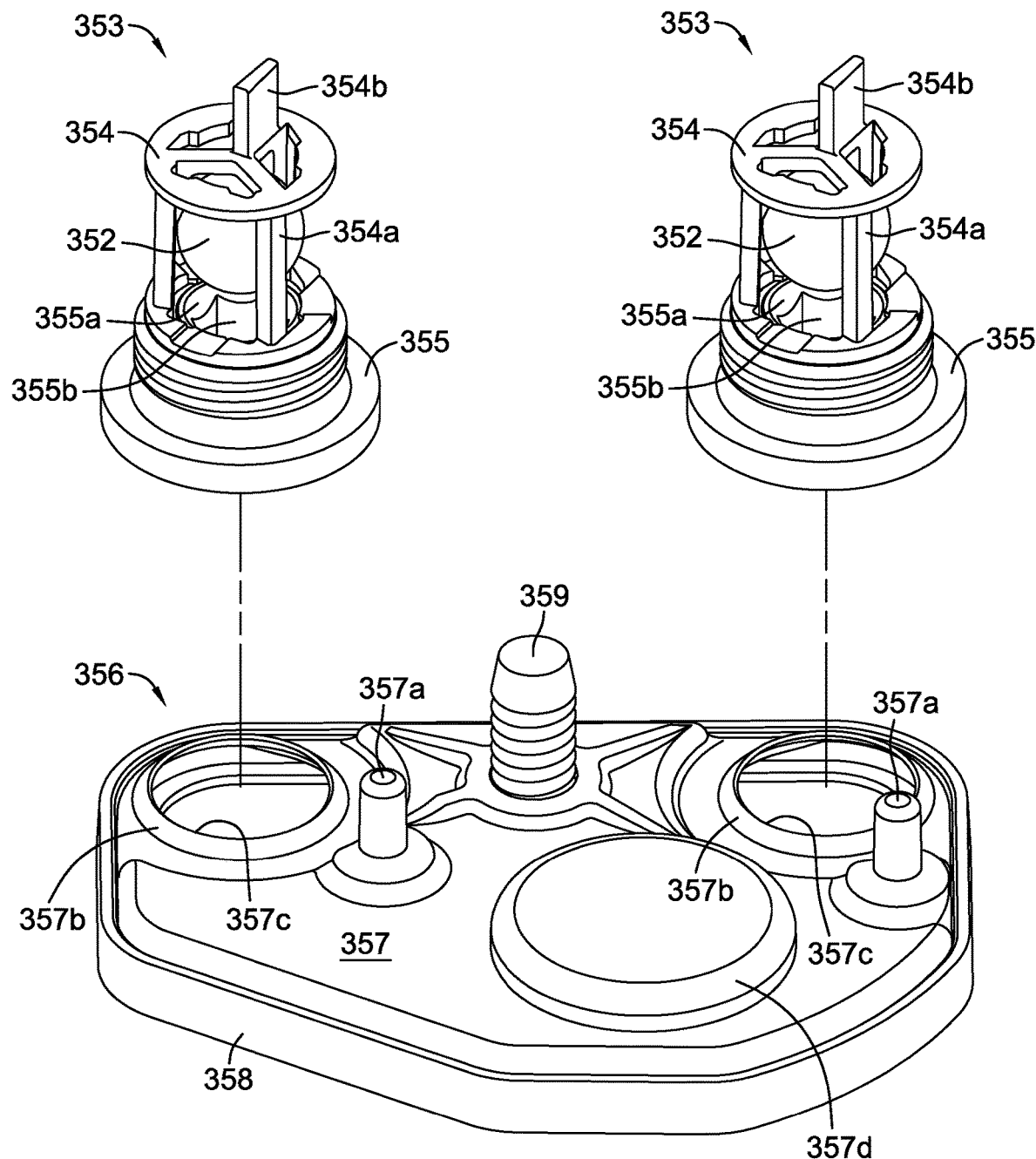
FIG. 13 is an exploded perspective view of a filter assembly of a transaxle in accordance with the teachings herein depicting its cooperation with a pair of check valves.

Additional functionality imparted to center section 350 includes a pair of threaded check valve ports 350s, a pair of filter pin locating pockets 350u, and a threaded filter screw pocket 350t, all formed on the side of center section 350 opposite pump running surface 350a. Referring to FIGS. 10, 12, and 13, each check valve port 350s communicates with one of the two separate passageways (not shown) formed in center section 350 between pump running surface 350a and motor running surface 350b. A pair of check valves 353 is disposed in the pair of check valve ports 350s to provide make-up hydraulic fluid to the closed hydraulic loop between axial piston pump 330 and axial piston motor 340. Check valves 353 comprise a threaded plug 355 having a valve seat 355a disposed about a first end of a valve opening 355b that passes longitudinally through threaded plug 355 and has a hexagonal form for use with a hex tool during installation of check valves 353 in check valve ports 350s. These threaded plugs 355 may optionally have a bleed passage (not shown) as described for check valves 153, depending on the desired ride quality of any vehicle equipped with transaxle 320. A check ball 352 that interacts with valve seat 355a is retained by a set of flexible ribs 354a in cage 354 of check valve 353. Cage 354 can be made of a flexible polymer such as glass filled nylon (e.g. a PA46 glass filled nylon), permitting the check ball to be inserted through flexible ribs 354a during assembly. An error proofing tab 354b prevents cage 354 from being installed in check valve port 350s in a reverse orientation, as it acts to prevent installation of threaded plug 355 when installed improperly.

Figure 13A:
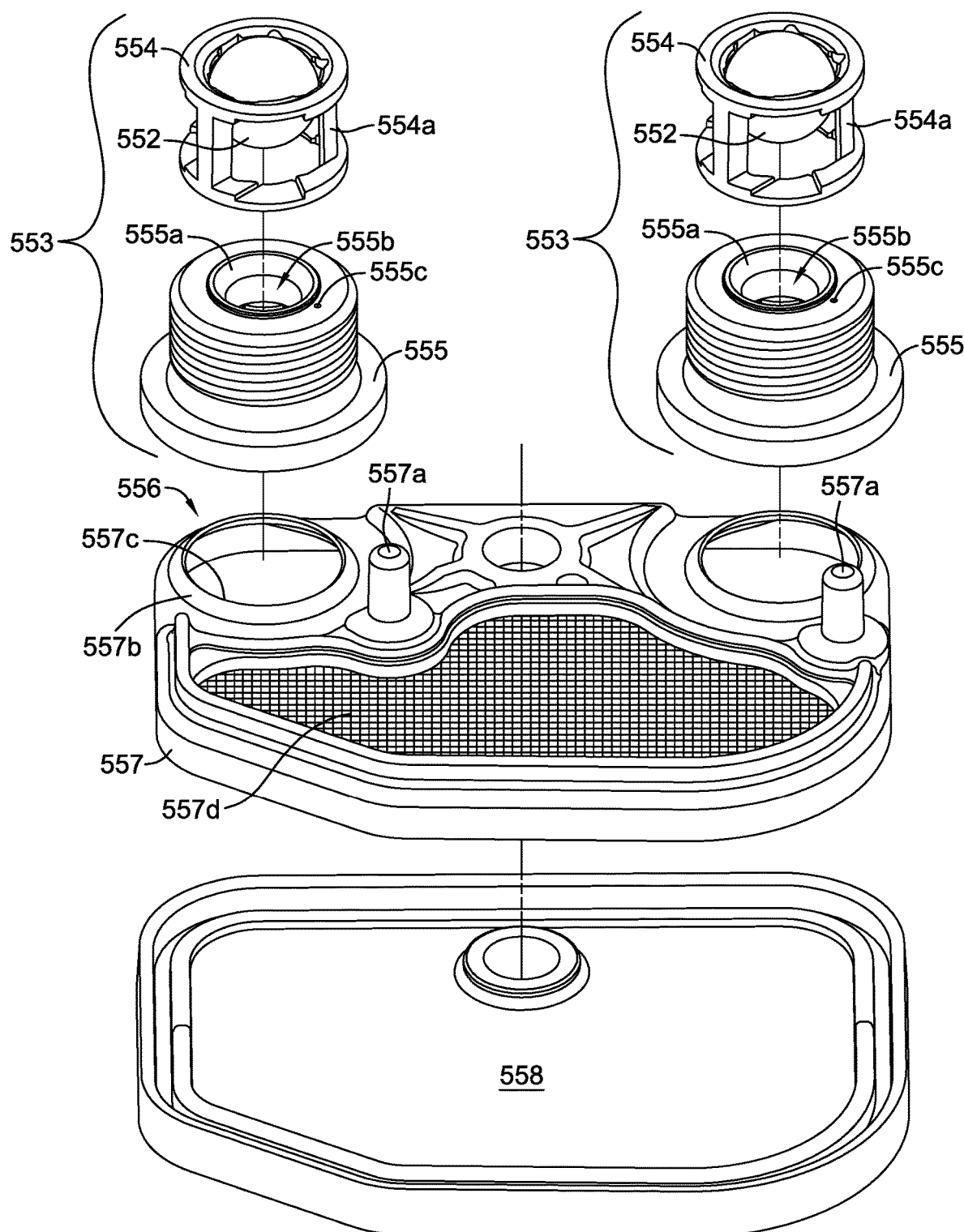
FIG. 13A is an exploded perspective view of another embodiment of a filter assembly depicting its cooperation with an alternate pair of check valves.

An alternate embodiment of a check valve 553 is illustrated in FIG. 13A, wherein cage 554 is symmetrically designed to allow reversible installation in check valve port 350s of center section 350, eliminating the need for an error proofing tab. In the manner previously described for check valve 353, a check ball 552 is sized to sealingly interact with a valve seat 555a disposed about a first end of a valve opening 555b longitudinally formed in a threaded plug 555. Check ball 552 may be pressed through either end of cage 554 to be retained therein by a plurality of ribs 554a, wherein the material composition of cage 554 may be that of a flexible polymer such as a glass filled nylon. Threaded plug 555 may optionally have a bleed passage 555c whose diameter may be varied to produce a desired ride quality in any vehicle equipped with transaxle 320. It should be noted that the longitudinal length of the combined components of check valves 353 and 553 will be the same for purposes of installation in a given port, such as check valve port 350s, whereby the relative lengths of their cages 354, 554 and threaded plugs 355, 555 can differ, but are dimensioned to result in the same overall length.

Referring again to FIGS. 10, 12 and 13, a filter 356 may be installed on center section 350 to remove contaminants from hydraulic fluid entering the closed hydraulic loop through one or the other of check valves 353. The check valve 353 in communication with the low pressure or suction side of the closed hydraulic loop may permit make-up fluid to pass through its valve opening 355b as check ball 352 is displaced from valve seat 355a by differential pressure on each side of check valve 353. Filter 356 comprises a filter base 357 and a filter cover 358 whose respective side walls are sealingly joined when fastener 359, in this instance a threaded screw, affixes filter 356 to center section 350 at threaded filter screw pocket 350t. A pair of filter locating pins 357a integrally-formed on filter base 357 mate with filter pin locating pockets 350*u* on center section 350 to properly align the openings 357*c* formed on filter base 357 with each of the check valves 353 installed in center section 350. A deformable lip 357*b* surrounds each of the openings 357*c* to sealingly engage the external face of each valve plug 355 when fastener 359 is properly torqued. As best shown in FIG. 10, filter cover 358 has a filter screen 358*b* to permit the intake of hydraulic fluid from sump 315 through check valves 353 and a reinforced bridge structure 358*a* to accept the loading of fastener 359 and also deflect the stream of high pressure hydraulic fluid escaping through an optional bleed passage (not shown) in valve plug 355, protecting filter screen 358*b* from damage. A magnet 348 may be disposed in magnet pocket 357*d* to collect any fine metal shavings circulating in the hydraulic fluid to improve the service life of critical components of transaxle 320.

An alternate embodiment of a filter 556 is depicted in FIG. 13A, wherein the filter screen 557*d* has been relocated to the filter base 557. As affixed to center section 350 in the manner previously described for filter 356, filter screen 557*d* is oriented at the top of filter 556, reducing the introduction of entrained air into the closed hydraulic loop of center section 350 and improving hydraulic efficiency. Filter cover 558 is now formed as a solid cover that sealingly engages filter base 557 in the manner previously described for filter 356, and further provides reinforcement to accept the loading of a fastener, such as fastener 359, and deflects the stream of high pressure hydraulic fluid escaping through an optional bleed passage 555*c* in threaded plug 555. The form and function of a pair of filter locating pins 557*a* and a pair of deformable lips 557*b* surrounding each of the openings 557*c* of filter base 557 is substantially similar to that of filter base 357 and will not be further detailed herein. It should be noted that the filters 356, 556 and check valves 353, 553 described herein can be alternately paired with each other to work in combination with center section 350.

Referring to FIGS. 8, 9, 11 and 12, transaxle 320 includes an alternate embodiment of a block-lift bypass mechanism 360 having a U-shaped block-lift member 363 and a bypass actuator 361. Bypass mechanism 360 functions in substantially the same manner previously described for bypass mechanism 160, but varies in terms of the means by which its bypass actuation rod 361*b* is retained in main housing 322, and the manner in which its bypass arm 361*a* interacts with main housing 322 to limit rotation of the bypass actuation rod 361*b*.

Bypass mechanism 360 has block-lift member 363 moveably disposed adjacent motor cylinder block 341 and bypass actuator 361. Bypass actuator 361, including a bypass arm 361*a* and a bypass actuation rod 361*b*, extends into main housing 322. In this embodiment, bypass arm 361*a* is integrally formed with bypass actuation rod 361*b*, though it could be detachably joined thereto in a known manner, and bypass actuation rod 361*b* is oriented generally parallel to pump input shaft 329. A first end 361*j* of bypass actuation rod 361*b* can be formed as a cam section 361*c* that permits bypass actuator 361 to be rotated in a clockwise direction or a counterclockwise direction in actuating bypass mechanism 360.

Figure 8:
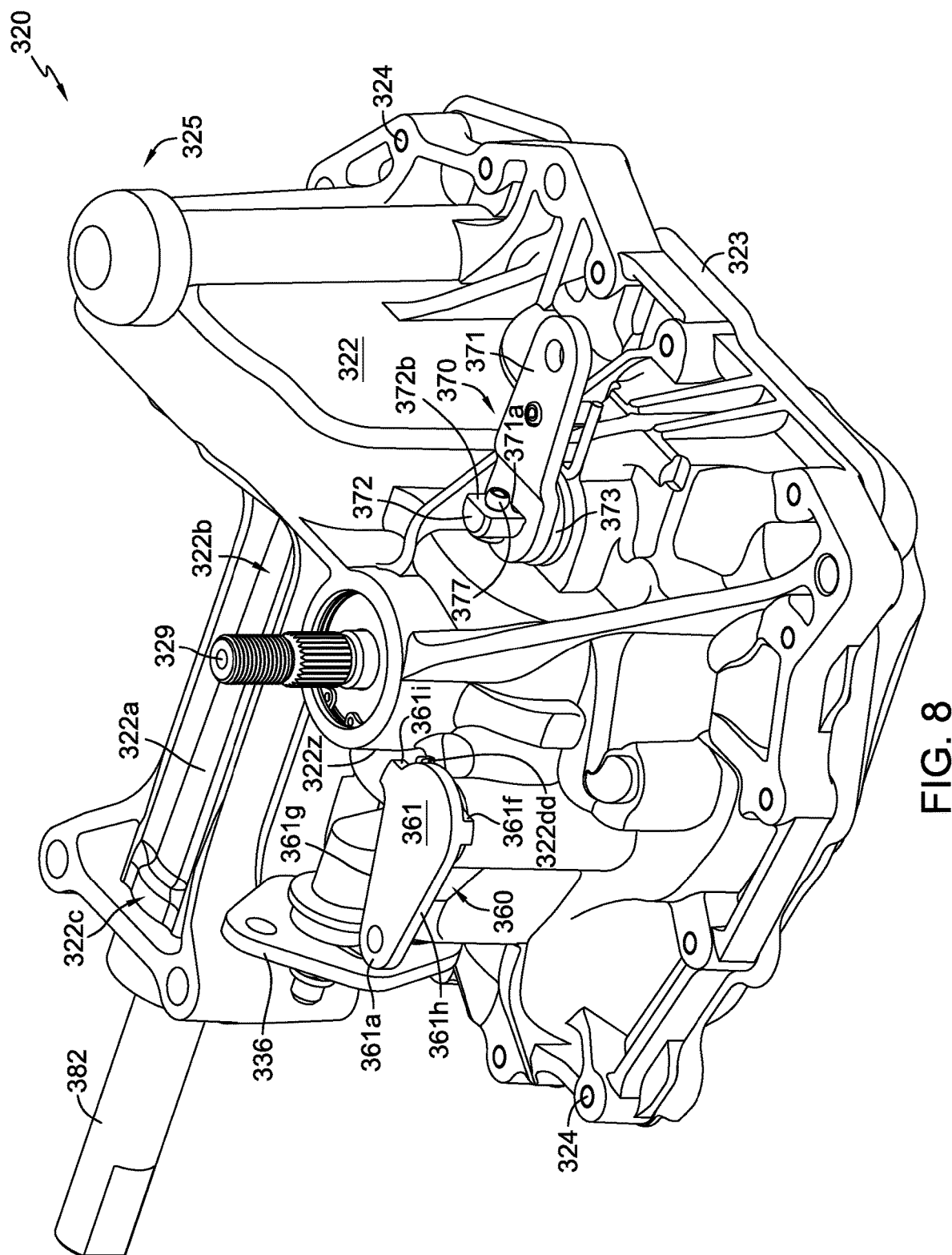
FIG. 8 is a perspective view of another embodiment of a transaxle in accordance with the teachings herein.
Figure 9:
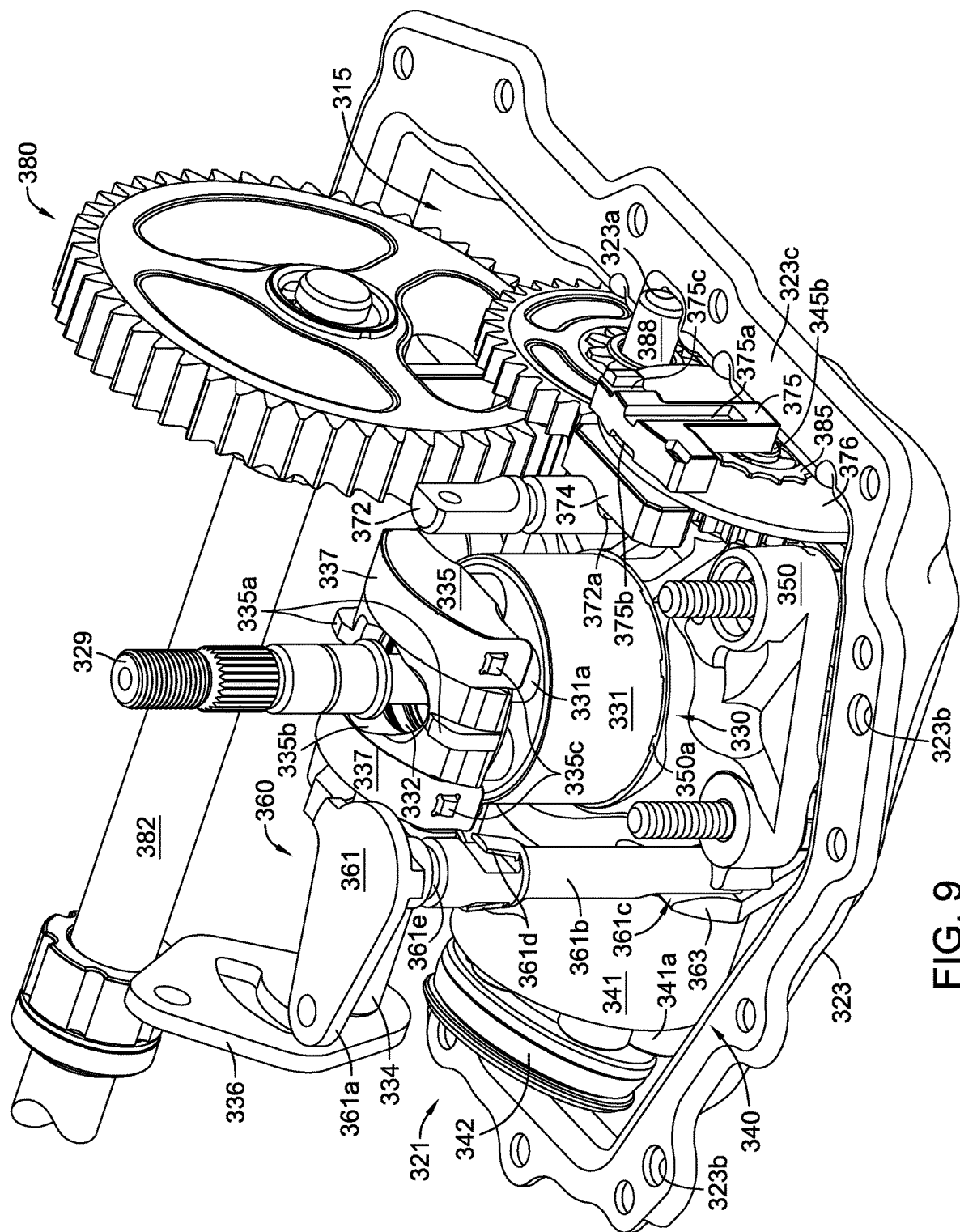
FIG. 9 is a perspective view of a portion of the transaxle shown in FIG. 8, with certain components removed for clarity.

Bypass arm 361*a*, which is formed to effect rotation of bypass actuation rod 361*b* in cooperation with a mechanical linkage (not shown), includes one or more rotation stop tabs, 361*f* and 361*i* for example, which, along with the edges 361*g*, 361*h* of bypass arm 361, engage various features on main housing 322 to prevent over-rotation of bypass actuation rod 361*b*. This ensures that the amount of block-lift achieved (i.e. hydraulic bypass) builds to a maximum when the stop tabs 361*f*, 361*i* or edges 361*g*, 361*h* engage corresponding features on main housing 322 to prevent an over-rotation condition where hydraulic resistance may still be present in the closed hydraulic loop between hydraulic pump 330 and hydraulic motor 340. Such resistance hinders manual movement of an unpowered vehicle equipped with transaxle 320. It is important to note that as depicted in FIG. 8, transaxle 320 is a right-hand unit, meaning that it would be mounted on the right-hand side of a vehicle with its input shaft 329 oriented toward the front of the vehicle. Correspondingly, a mirror-image left-hand unit (not shown), would be mounted on the left-hand side of a vehicle such that its input shaft would also be oriented toward the front of the vehicle. Stop tab 361*f* lies below the plane of bypass arm 361*a* to engage a boss 322*dd* formed on main housing 322 that stop tab 361*i* passes over during counterclockwise rotation of bypass actuator 361, as stop tab 361*i* lies within the plane of bypass arm 361*a*. During clockwise rotation, block-lift bypass is maximized when edge 361*g* contacts input shaft boss 322*z*. Conversely, for a left-hand transaxle unit (not shown), stop tab 361*i* engages a housing boss somewhat taller than boss 322*dd* during clockwise rotation of bypass actuator 361, and edge 361*h* contacts the input shaft boss during counterclockwise rotation of bypass actuator 361. Thus, bypass actuator 361 may be used in both right-hand and left-hand transaxle units.

Bypass actuation rod 361*b* is shown in FIG. 12 with first end 361*j* rotatably supported in a bypass rod pivot opening or cradle 350*g* formed in center section 350 and positioned adjacent block-lift member 363. A second end of the bypass actuation rod 361*b* extends through a bypass actuation rod opening 322*t* formed in main housing 322. An O-ring groove 361*e* is shown as formed on bypass actuation rod 361*b* and structured to receive a sealing O-ring (not shown). The sealing O-ring can aid in the prevention of fluid leaks by sealing around bypass actuation rod 361*b* in a conventional manner in opening 322*t*. In addition, one or more retention tabs 361*d* can be formed on bypass actuation rod 361*b*, where a pair of exemplary retention tabs 361*d* is illustrated in FIG. 12, to prevent outward movement of bypass actuator 361, thereby retaining bypass actuation rod 361*b* in main housing 322. Retention tabs 361*d* are flexible in nature to compress during passage through opening 322*t* and expand after insertion into main housing 322, acting therein against bypass actuator retention surface 322*u* to ensure retention. The O-ring and retention tab configuration allows bypass actuation rod 361*b* to easily be inserted into main housing 322 through opening 322*t* during assembly.

In FIGS. 11 and 12, bypass mechanism 360 includes a block-lift member 363 having a first block-lift leg 363*a* with a first formed end 363*d*, a second block-lift leg 363*b* with a second formed end 363*e*, and a pivot rod 363*c* connecting first block-lift leg 363*a* to second block-lift leg 363*b*. Pivot rod 363*c* of block-lift member 363 can be rotatably disposed in a pivot groove 350*e* formed on center section 350 and have a locating protrusion 363*g* on pivot rod 363*c* structured to engage a gap between locating or retention ribs 350*p* on center section 350. Cam form 361*c* on the first end of bypass actuation rod 361*b* is positioned adjacent to first formed end 363*d*. Cam form 361*c* of bypass actuation rod 361 can bear against first formed end 363*d* of first block-lift leg 363*a* to force block-lift member 363 to rotate about an axis of pivot rod 363*c*. A retention projection 363*f* is formed on each of first formed end 363*d* and second formed end 363*e* where each of retention projections 363*f* interfaces with a corresponding surface 350*f* formed on center section 350 to retain pivot rod 363*c* in pivot groove 350*e*. Corresponding surface 350*f* of various embodiments can be an arcuate surface. Block-lift member 363 straddles motor output shaft 345 and contacts motor cylinder block 341 in multiple locations when lifting motor cylinder block 341 from motor running surface 350*b*.

As illustrated in FIG. 12, block-lift bypass mechanism 360 is in a disengaged state. Rotation of bypass actuation rod 361*b* causes block-lift member 363 to contact motor cylinder block 341 in at least two places to thereby lift motor cylinder block 341 away from motor running surface 350*b*. When bypass actuator 361 is rotated in either a clockwise or counterclockwise direction to initiate engagement of block-lift bypass mechanism 360, cam form 361*c* bears against first formed end 363*d*, thereby forcing block-lift member 363 to rotate about the axis of pivot rod 363*c*. Retention projections 363*f* formed on each of formed ends 363*d* and 363*e* interface with corresponding surfaces 350*f* formed on center section 350 to guide the rotation of block-lift member 363 while retaining pivot rod 363*c* in pivot groove 350*e*. When block-lift member 363 is rotated, first formed end 363*d* and second formed end 363*e* cooperatively contact and lift motor cylinder block 341 from motor running surface 350*b*. Formed ends 363*d*, 363*e* and their respective block-lift legs 363*a*, 363*b* form gradual curves along their lengths to ensure that contact with motor cylinder block 341 occurs on both sides of motor cylinder block 341 near a line that bisects motor output shaft 345 and lies parallel to the axis of pivot rod 363*c*, reducing wear on components by lifting motor cylinder block 341 in an axial direction with respect to the axis of motor output shaft 345. This lift breaks hydraulic fluid communication between motor pistons 341*a* and a set of fluid ports 350*m* formed in motor running surface 350*b*; and more generically, it breaks the fluid communication between axial piston pump 330 and axial piston motor 340. Thus, motor output shaft 345, reduction gear set 380, and axle 382 are free to rotate without hydraulic resistance.

The brake mechanism 370 of transaxle 320, as illustrated in FIGS. 8, 9, 10 and 10*a*, has substantially similar form and function to the previously described brake mechanism embodiments, particularly that of FIG. 7, but comprises additional error-proofing features provided for its outer puck 375 and a revised brake arm 371 and brake shaft 372 engagement. As compared to outer puck 275, outer puck 375 of the present embodiment has an additional groove 375*c* for error-proofing purposes during installation. Grooves 375*a* and 375*c* cooperate with a pair of projections 322*y* formed on main housing 322 to ensure proper orientation of outer puck 375 during assembly of transaxle 320. It should be understood that a plurality of corresponding grooves and projections can be utilized for this purpose. Clearance around the second end 345*b* of motor output shaft 345 is provided by a groove 375*b* on the opposite face of outer puck 375 from grooves 375*a* and 375*c*. A pair of outer puck locators 322*q* formed on main housing 322 help guide and retain outer brake puck 375, along with a thrust surface 322*r* formed on main housing 322. Unlike the inner puck locators 122*n* of brake mechanism 170 (a pair of projections), the additional width of inner puck 374 is accommodated by inner puck locators 322*n* (a tab and an inner housing wall of main housing 322).

As compared to the engagement means of brake arm 171 and brake shaft 172, wherein a roll pin 177 or the like not only retains brake arm 171 on brake shaft 172, but also bears the torque load associated with actuating brake mechanism 170, the external end of brake shaft 372 is formed with a single D-shaped cross-section 372*b* to more robustly engage a brake arm 371, which has a corresponding single D-shaped opening 371*a*. A fastener, such as exemplary rivet 377, merely retains brake arm 371 on brake shaft 372 and prevents axial movement along the axis of brake shaft 372. The torque load associated with actuating brake mechanism 370 is borne by the single D-shape engagement. The biasing of brake mechanism 370 to a disengaged state by a spring, such as torsion spring 373, is as previously described for brake mechanism 170 and will not further be described herein. Similarly, the function of brake mechanism 370 through use of a brake rotor 376 slidingly disposed about a pinion gear 385 and further disposed between and selectively engaged by an inner puck 374 and an outer puck 375 upon rotation of a brake shaft 372 having a cam form 372*a* on the end proximate to inner puck 374, which also serves to retain inner puck 374, is as previously described for brake mechanism 170 and will not be further detailed herein.

Figure 10A:
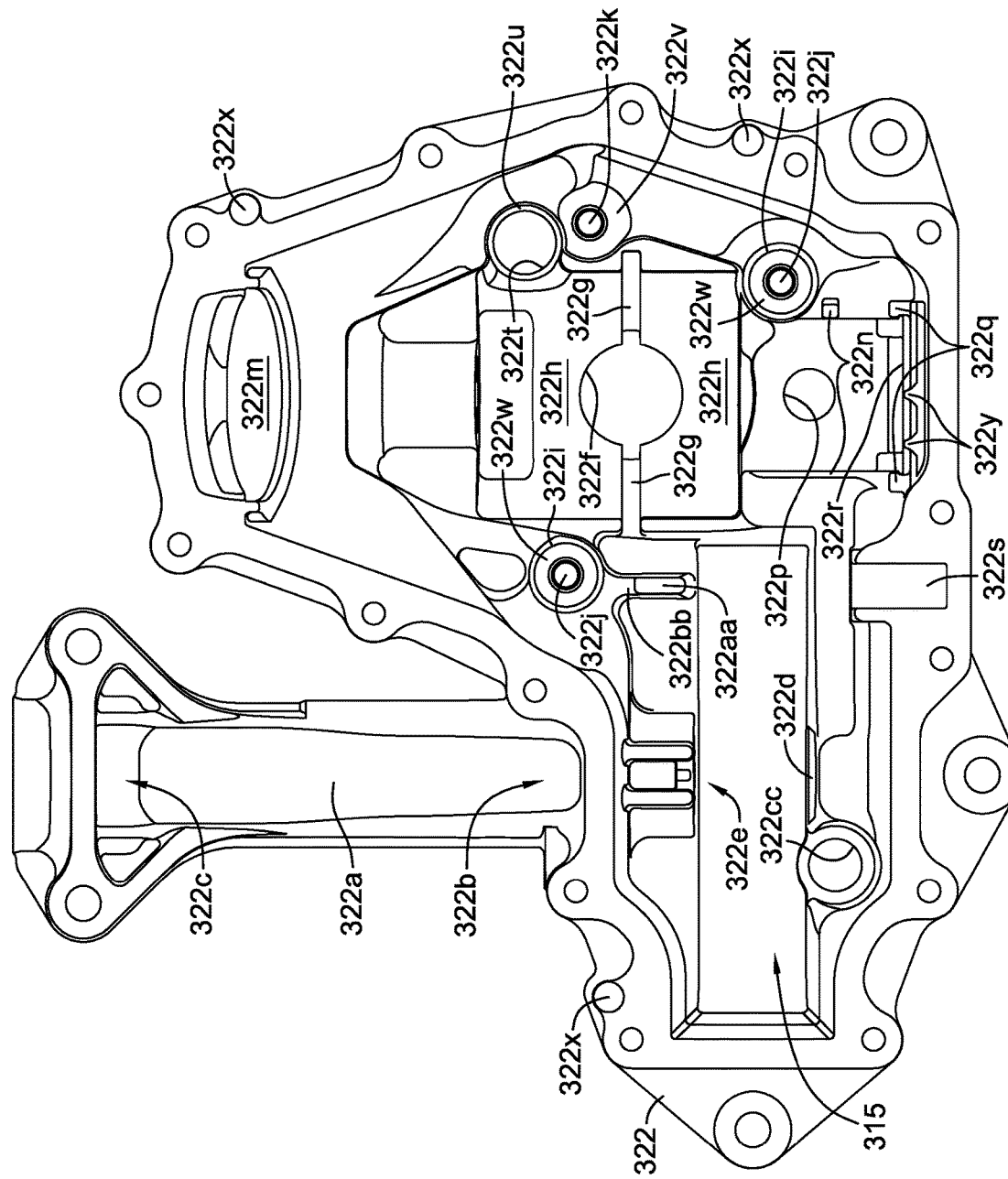
FIG. 10A is another view of the portion of the transaxle as shown in FIG. 10, with additional components removed for clarity.
Figure 14:
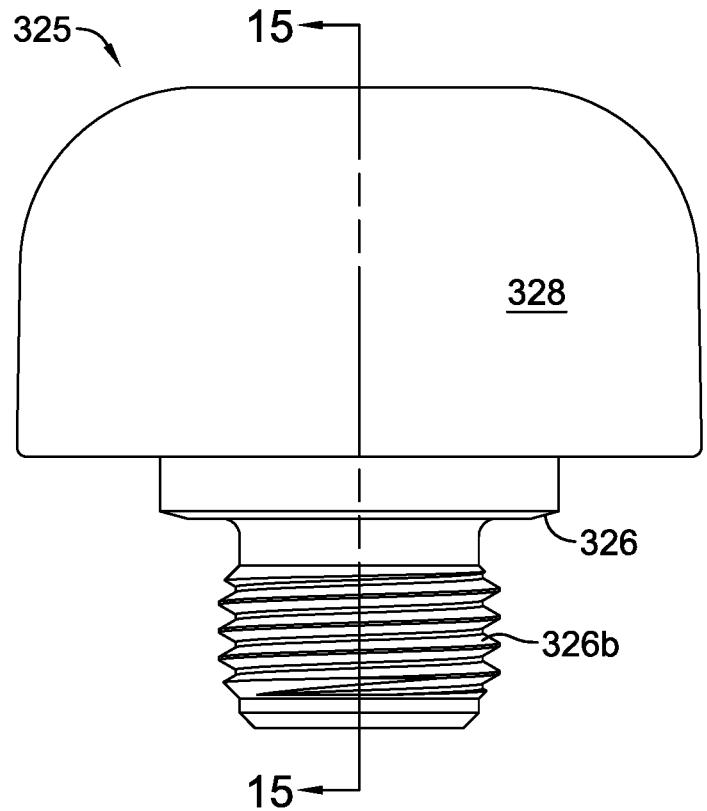
FIG. 14 is a side view of a vent assembly of a transaxle in accordance with the teachings herein.
Figure 15:
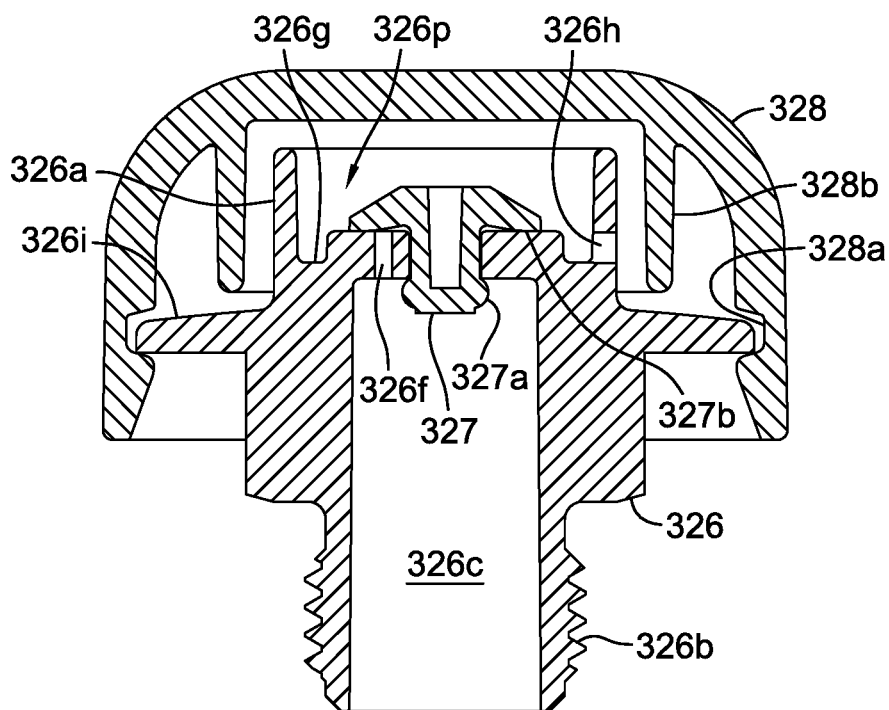
FIG. 15 is a cross-sectional view of the vent assembly shown in FIG. 14 along the line 15-15.
Figure 16:
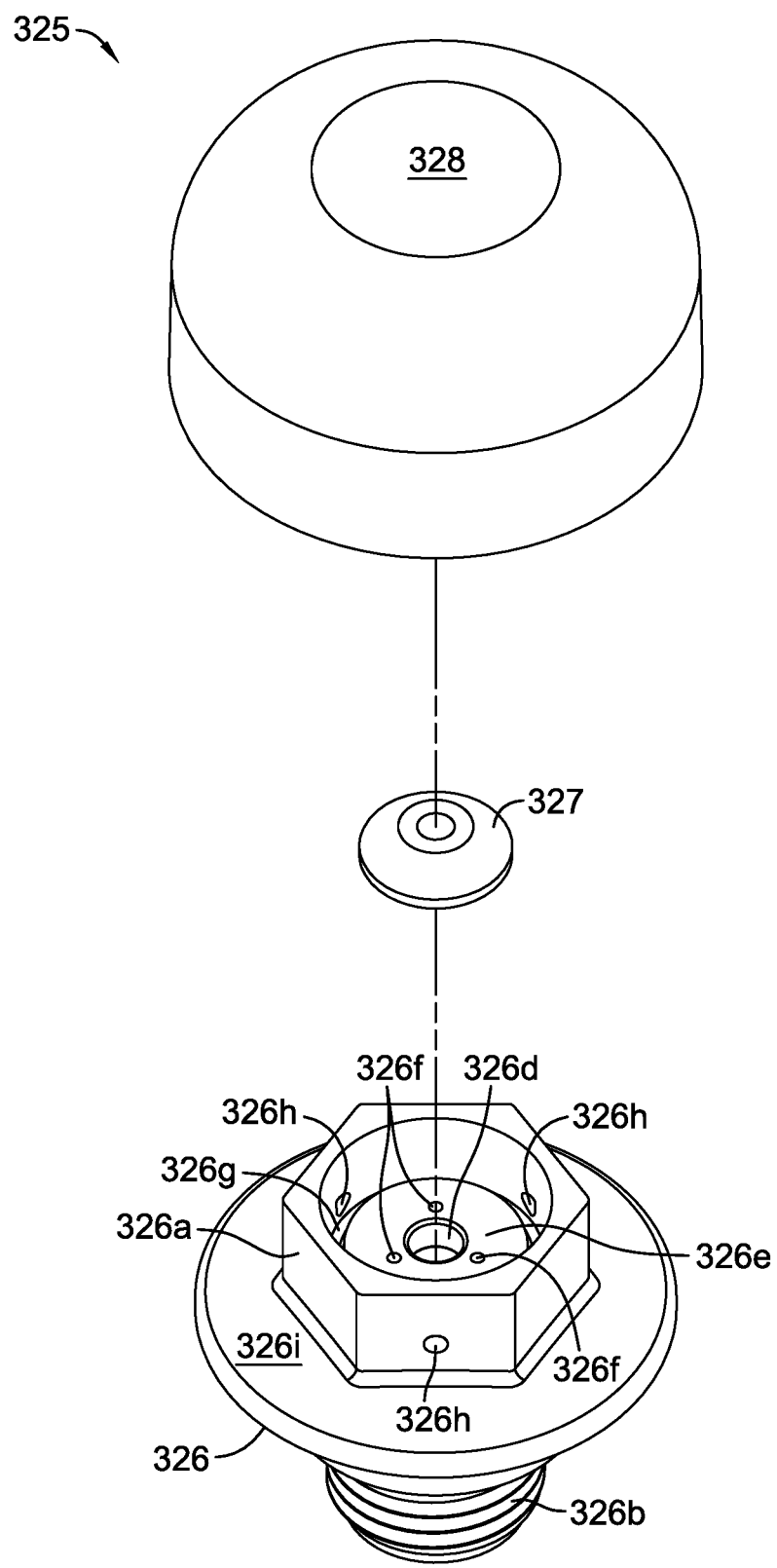
FIG. 16 is an exploded perspective view of the vent assembly shown in FIG. 14.
Figure 17:
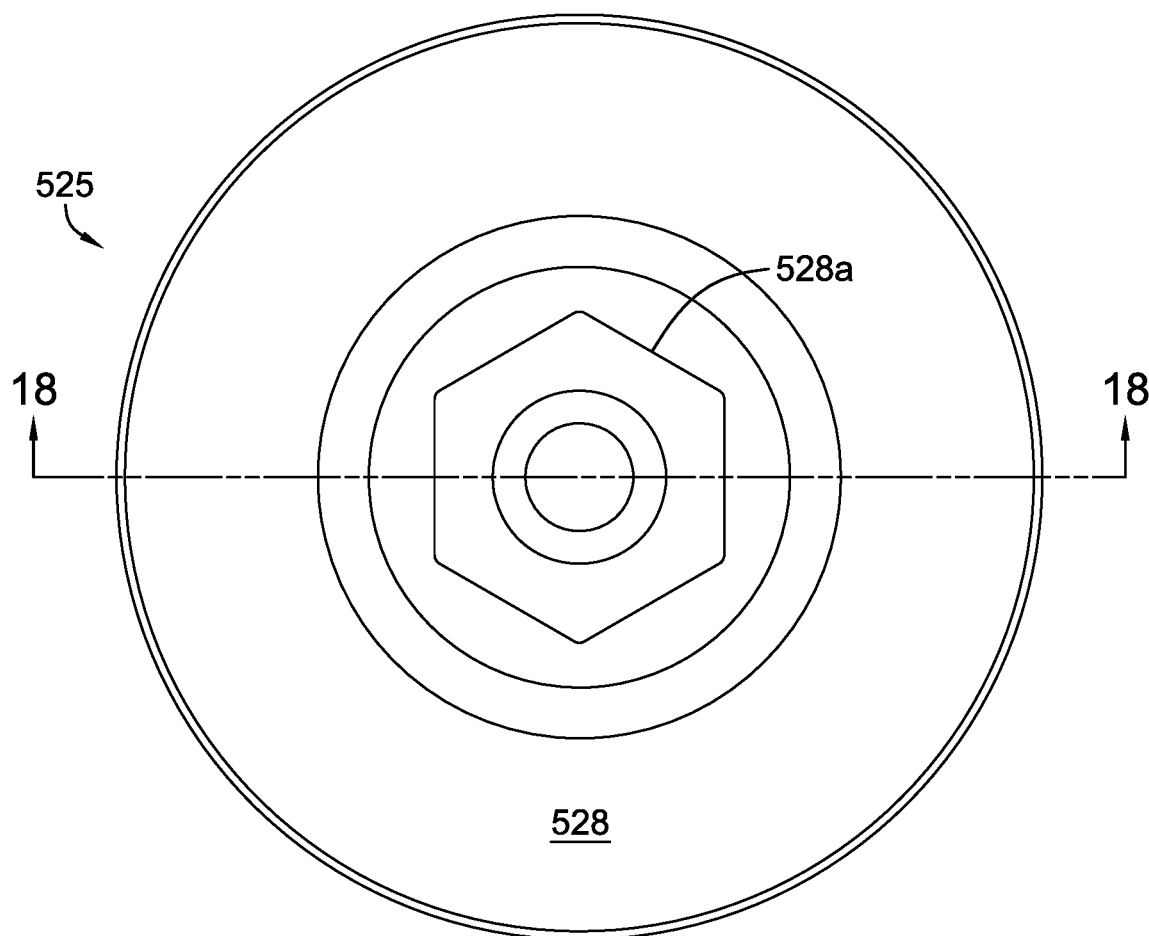
FIG. 17 is a top view of another embodiment of a vent assembly.
Figure 18:
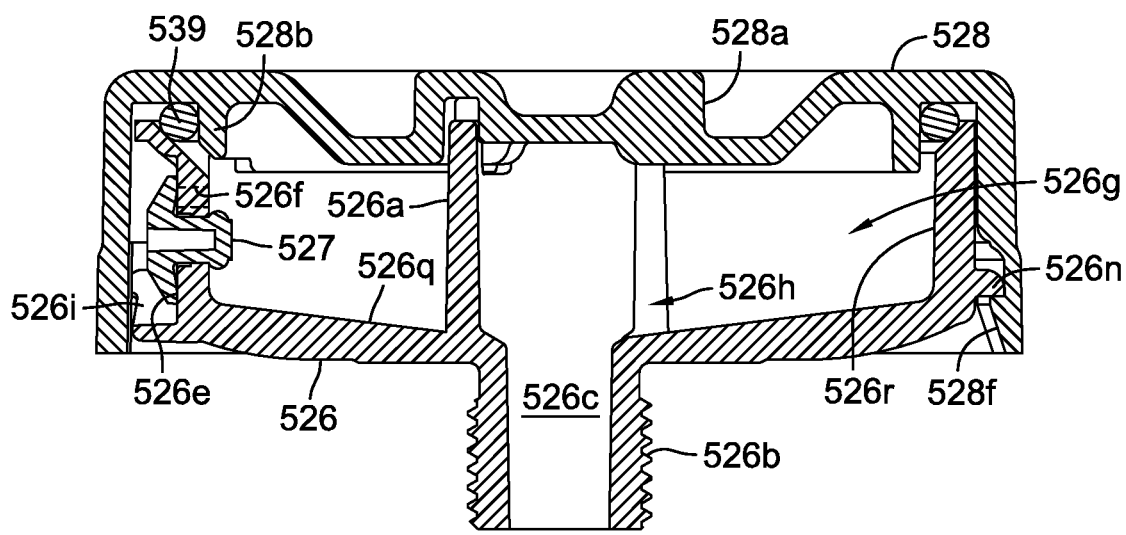
FIG. 18 is a cross-sectional view of the vent assembly of FIG. 17 along the line 18-18.
Figure 19:
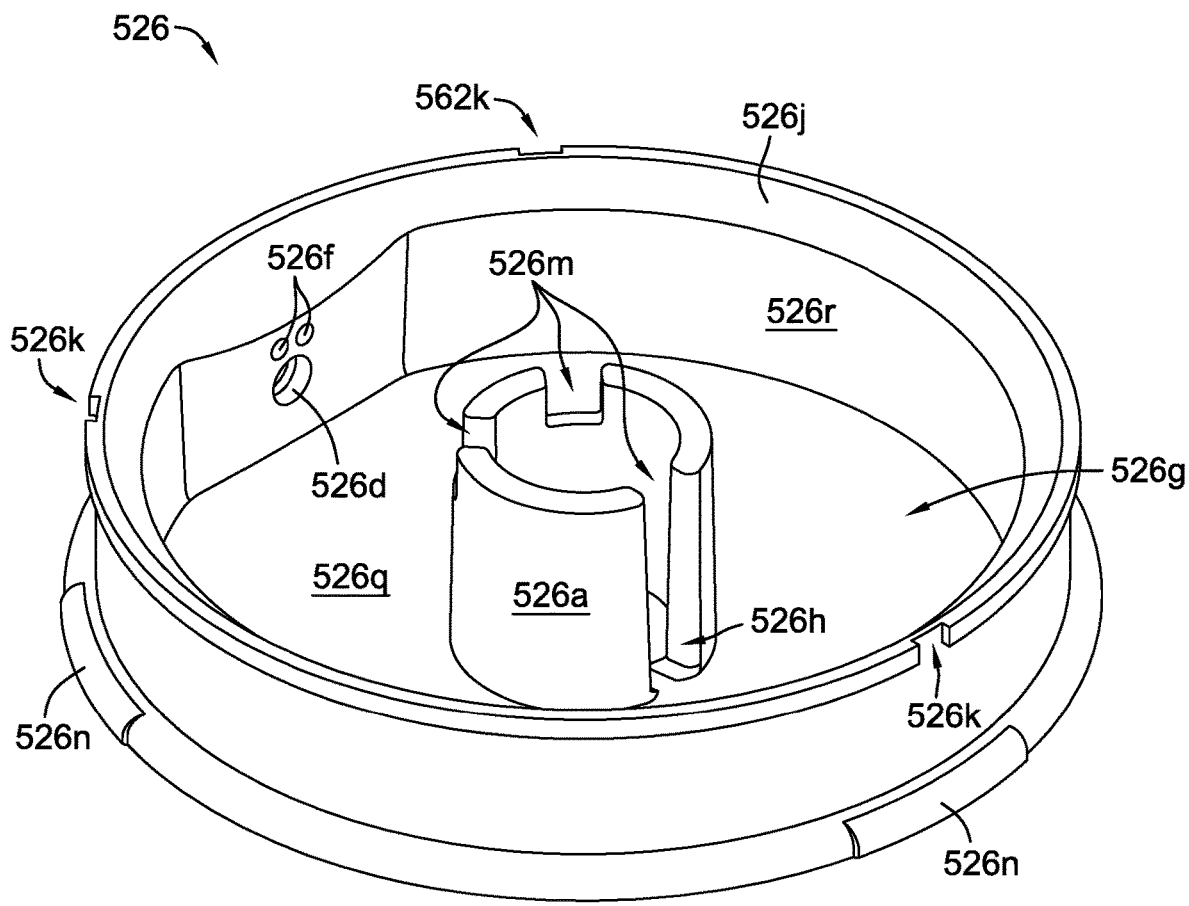
FIG. 19 is a perspective view of the base of the vent assembly of FIG. 17.
Figure 20:
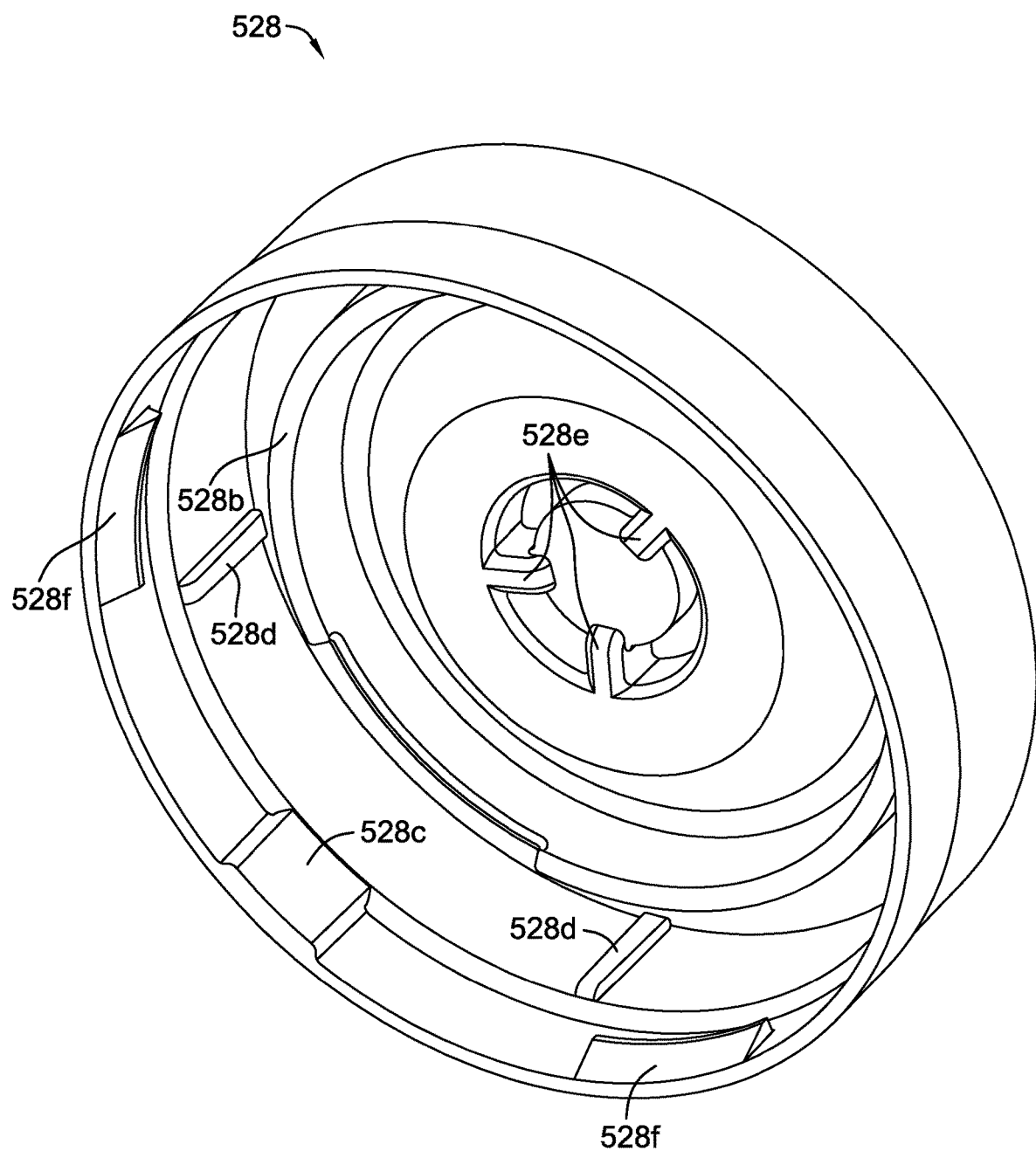
FIG. 20 is a perspective view of the cap of the vent assembly of FIG. 17.
Figure 21:
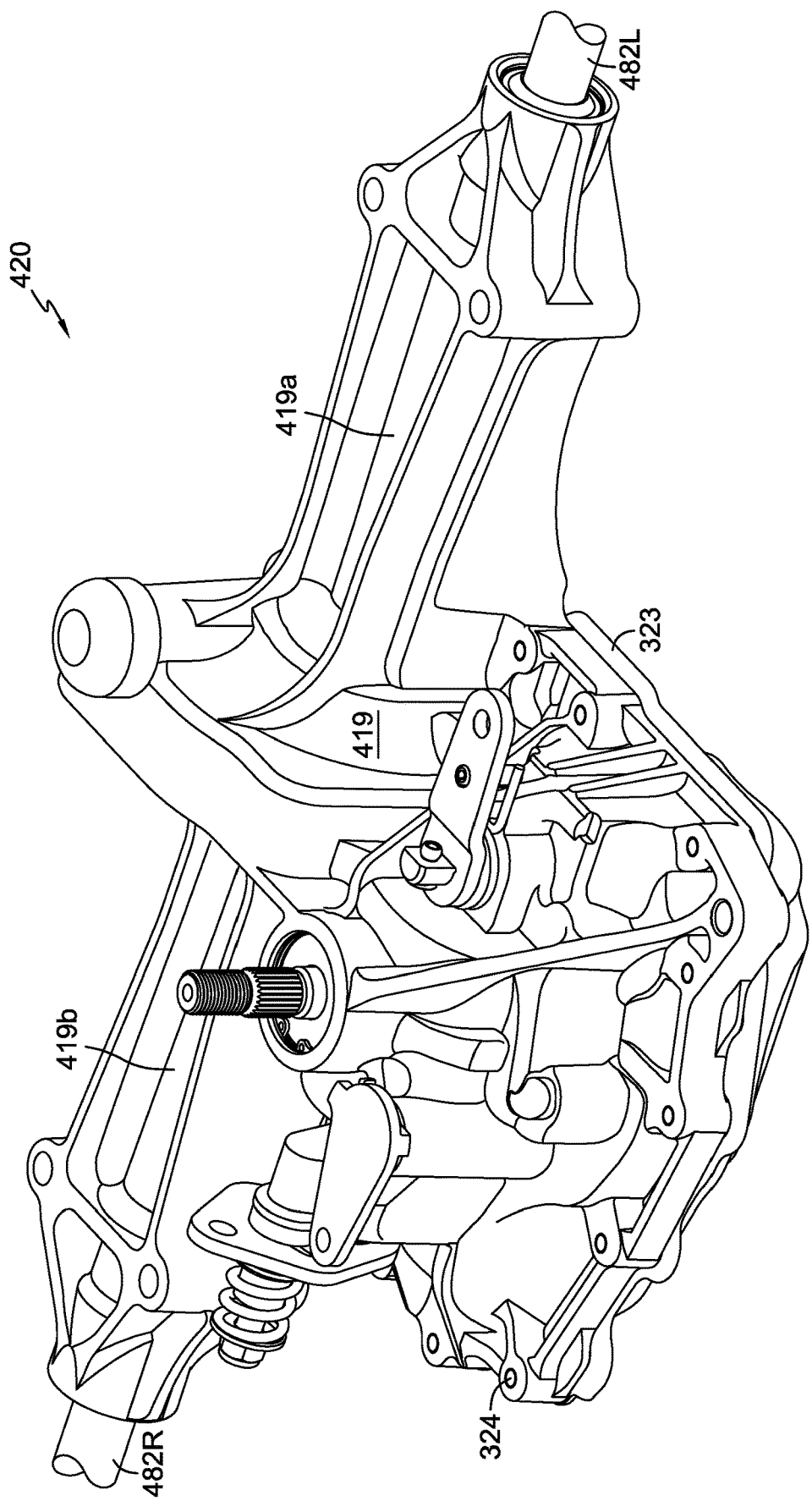
FIG. 21 is a perspective view of another embodiment of a transaxle in accordance with the teachings herein.
Figure 22:
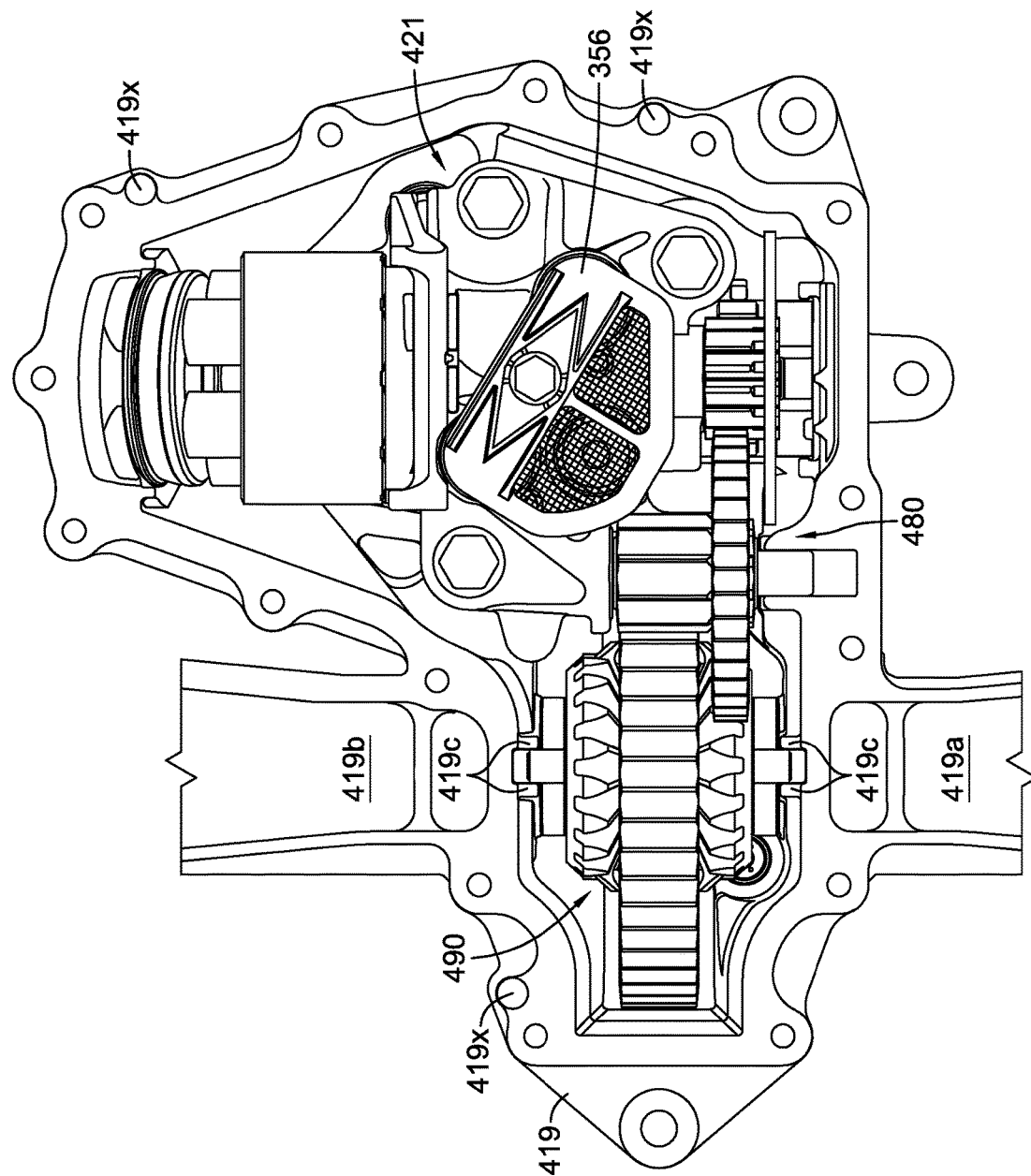
FIG. 22 is a bottom view of a portion of the transaxle shown in FIG. 21, with certain components removed for clarity.
Figure 23:
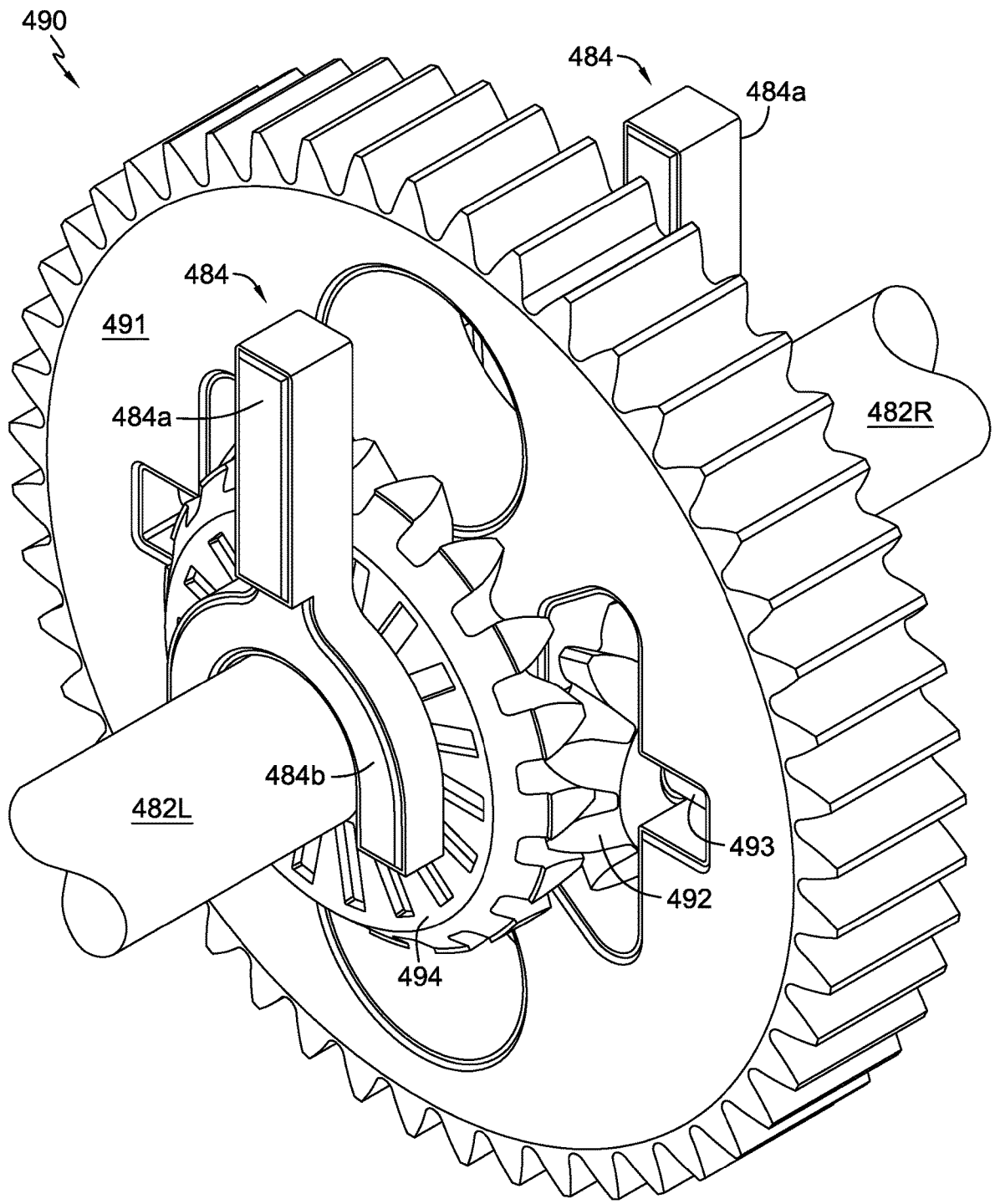
FIG. 23 is a perspective view of the differential assembly of the transaxle shown in FIG. 21.
Figure 24:
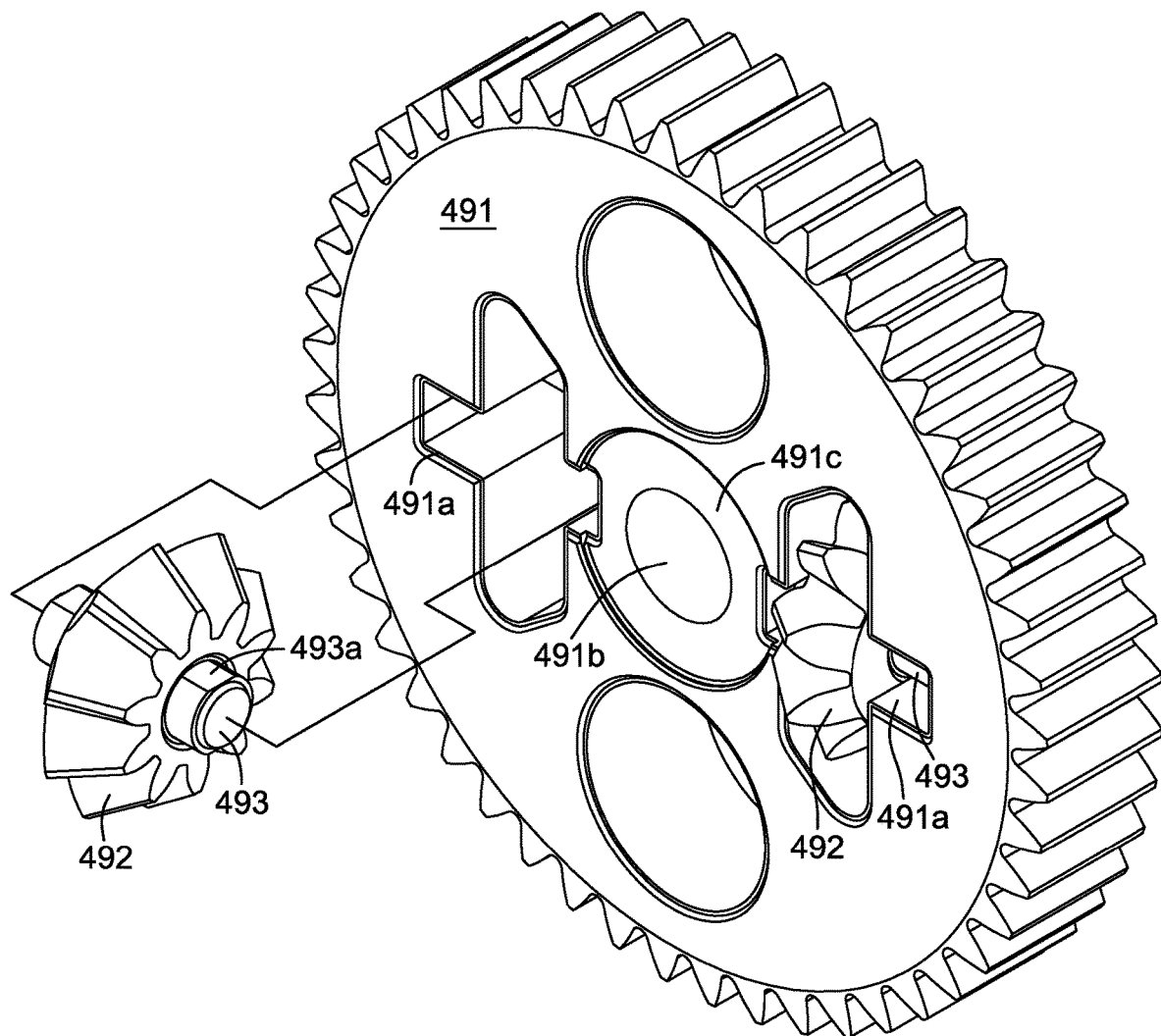
FIG. 24 is a partially-exploded, perspective view of the differential assembly of FIG. 23, with certain components removed for clarity.

As shown in FIGS. 8, 10 and 10A, transaxle 320 is outfitted with a vent assembly 325 located in a threaded port 322*cc* formed at or near the highest point of main housing 322. Referring to FIGS. 14, 15 and 16, vent assembly 325 has a flow path formed through it to prevent the buildup of case pressure in transaxle 320 as the temperature of its hydraulic fluid increases under operating conditions, venting trapped air and in extreme cases, expanded hydraulic fluid, to protect the integrity of various shaft seals found in transaxle 320. A corresponding function of vent assembly 325 is to prevent the intrusion of water and other contaminants, as can occur during washing of a vehicle equipped with transaxle 320. Vent assembly 325 includes a main body 326, a valve 327, and a vent cap 328.

Vent cap 328 is generally formed as a flattened dome, though other external shapes can be suitable. A spray shield 328*b* is shown extending from the internal surface of vent cap 328 to form a circular wall. A locking groove 328*a* is formed near the periphery of the internal surface of vent cap 328.

Main body 326 is generally formed as a cylindrical fitting having an externally threaded lower portion 326*b* and a tool form upper portion 326*a* radially disposed about a valve seat 326*e* to form an open center cavity 326*p*. A primary passage 326*c* runs throughout the length of main body 326, and a downwardly sloped flange 326*i* extends radially about main body 326 between its upper and lower portions. Primary passage 326*c* is open at a first, lower end and terminates at a second, upper end having a reduced diameter valve retention aperture 326*d* and a plurality of smaller valve passages 326*f* radially disposed thereabout, each passing through to valve seat 326*e*. A drain groove 326*g* is disposed about valve seat 326*e* within center cavity 326*p* and lies below the surface of valve seat 326*e*. One or more drain passageways 326*h* provide fluid communication between drain groove 326*g*, and consequently center cavity 326*p*, and the exterior of main body 326. When vent assembly 325 is installed in threaded port 322*cc* of main housing 322, an O-ring (not shown) is utilized to insure a proper seal, and an appropriate tool is used to engage tool form 326*a* to first turn down main body 326 to an appropriate torque. As illustrated, tool form 326*a* is an external hex-form, such that an open wrench or socket may be used to install main body 326. Other specialized tool forms and corresponding tools are contemplated within the scope of this application, including an internal hex-form such that a key wrench may be applied to install main body 326.

A flexible umbrella valve 327 is disposed in valve retention aperture 326*d* such that its retention bead 327*a* lies within primary passage 326*c* and its sealing flange engages valve seat 326e to close off the plurality of valve passages 326f. The pressure rating of the particular umbrella valve 327 utilized can be selected to prevent shaft seal leakage and meet the requirements of the specific application to which transaxle 320 is applied. As case pressure in transaxle 320 builds with increasing temperature during operation and reaches a value in excess of the pressure rating of umbrella valve 327, sealing flange 327b is lifted off of valve seat 326e, opening valve passages 326f to atmospheric pressure and allowing air, and in extreme cases hydraulic fluid, to be vented though valve passages 326f.

Vent cap 328 is snapped onto main body 326 after installation of umbrella valve 327 in valve retention aperture 326d to complete the installation of vent assembly 325. Locking groove 328a engages the periphery of downwardly sloped flange 326i to loosely join the components of vent assembly 325, permitting the passage of air and liquids, such as water or hydraulic fluid, therebetween. As assembled, spray shield 328b surrounds tool form 326a to form a baffle to thwart intrusion of water or other fluids. In the event that intrusive water does reach center cavity 326p, it will collect in drain groove 326g, pass through drain passages 326h, follow along downwardly sloping flange 326i and then proceed out of the vent assembly 325 between the loose engagement of flange 326i and locking groove 328a. The release of air and/or hydraulic fluid by umbrella valve 327 will result in the discharge of the respective fluids from vent assembly 325 by means of the same pathway described for the drainage of water from vent assembly 325.

An additional embodiment of a vent assembly 525 that may be utilized with a transaxle, such as transaxle 320, is illustrated in FIGS. 17, 18, 19, and 20. Like vent assembly 325, vent assembly 525 comprises a main body 526, a valve 527, and a vent cap 528. Vent assembly 525, however, benefits from an expanded internal volume that acts as a catch basin for hydraulic fluid and hinders its discharge through valve 527. Vent assembly 525 also benefits from having its tool form 528a disposed on the external surface of vent cap 528 such that vent assembly 525 can be preassembled prior to installation on a transaxle. Though shown as a hex-form, tool form 528a can be formed in a variety of shapes to cooperated with known tools.

Main body 526 is formed as a basin-shaped fitting having an externally threaded cylindrical lower section 526b disposed about a primary passage 526c open at a first, lower end. Primary passage 526c opens at a second, upper end into a circular basin 526g having a floor 526q that slopes down to primary passage 526c for drainage purposes and a sidewall 526r. Passing through sidewall 526r are a valve retention aperture 526d and a pair of valve passages 526f positioned proximate to, and above, valve retention aperture 526d. A flexible umbrella valve 527 is mounted in valve retention aperture 526d in the manner previously described for umbrella valve 327, selectively sealing valve passages 526f at a valve seat 526e formed on the external surface of sidewall 526r. A spray guard 526i formed external to sidewall 526r just below valve retention aperture 526d cooperates with a spray guard protrusion 528c formed internal to vent cap 528 to protect umbrella valve 527 from water intrusion. Concentrically positioned atop sidewall 526r is a chamfer 526j adapted to cooperate with a cylindrical wall 528b internal to vent cap 528 to capture an O-ring 539, sealing the joint therebetween. Rising from the floor 526q of basin 526g and concentrically positioned about the second, upper end of primary passage 526c is a central tower 526a having a plurality of anti-rotation slots 526m that engage cooperating anti-rotation ribs 528e internal to vent cap 528.

Basin passage 526h through central tower 526a permits communication between basin 526g and primary passage 526c. A plurality of alignment slots 526k above chamfer 526j cooperate with a like number of alignment ribs 528d formed internal to vent cap 528 to correctly align main body 526 and vent cap 528 for joinder. A plurality of snap-lock protrusions 526n along the external periphery of main body 526 engage a like number of snap-lock ramps 528f formed along the internal periphery of vent cap 528 to join the component parts of vent assembly 525.

Vent assembly 525 performs in the manner previously described for vent assembly 325 as temperatures rise during operating conditions, permitting the venting of expanding air to atmosphere through valve passages 526f and the intervening space between main body 526 and vent cap 528, while improving the retention of hydraulic fluid expelled from the housing of a transaxle by means of basin 526g and its communication with primary passage 526c via basin passage 526h.

FIGS. 21 through 27 depict an embodiment of a hydrostatic transaxle 420 that primarily varies from the previously disclosed embodiments in that its transmission 421 drives both a left-side axle 482L and a right-side axle 482R through a differential assembly 490. Correspondingly, main housing 419 comprises a left-side axle horn 419a and a right-side axle horn 419b to provide rotational support for axles 482L, 482R, respectively, in the manner previously described for axle horns 122a, 322a. Main housing 419 is sealingly closed by housing cover 323 with a plurality of fasteners 324 and integral locating pins 419x as described for the joinder of main housing 322 and housing cover 323.

It will be understood that transmission 421 is substantially similar in form and function to transmission 321, and as such, will not be further detailed herein. Any revisions to the pump thrust bearing grade or any addition of a valve plate to the pump running surface to accommodate higher system pressures attendant with two-axle transaxles will be understood to lie within the scope of this disclosure. Similarly, though transmission 421 is shown as incorporating filter assembly 356, it will be understood that an alternate filter assembly, such as filter assembly 556 may be considered within the scope of this disclosure. But for the incorporation of a differential-accommodating final drive gear or bull gear 491, reduction gear set 480 may also be considered substantially similar in form and function to reduction gear sets 180, 380, and as such, will not be further detailed herein. Any revisions to the specific gear reduction ratios to limit hydraulic system pressures will be understood to lie within the scope of this disclosure.

FIGS. 23 through 27 detail differential assembly 490 and its assembly. Generally speaking, differential assembly 490 is a necessary addition to a two-axle transaxle driven by a single transmission, such as illustrated by transaxle 420 and transmission 421. During vehicle turns, the axle associated with the larger, outside turn radius must rotate at a greater rate than the axle associated with the smaller, inside turn radius. Differential assembly 490 permits this accommodation.

In general terms, differential assembly 490 comprises a pair of opposing planet bevel gears 492 whose rotational axes are collinearly disposed and a pair of opposing axle bevel gears 494 whose rotational axes (and correspondingly, those of left-side axle 482L and right-side axle 482R) are collinearly disposed. The rotational axes of these gear sets intersect in a perpendicular orientation, as each planet bevel gear 492 engages each axle bevel gear 494 in a quadrilateral engagement pattern.

Bull gear 491 has various openings 491a, 491b and recesses 491c to accommodate the components of differential assembly 490 in this quadrilateral engagement pattern. Each of a pair of openings 491a is configured to accept a pin 493 upon which a planet bevel gear 492 is rotationally supported, the pin having a flat end 493a at each end, which when properly situated in opening 491a, prevents its rotation. Each opening 491a also accommodates the planet bevel gear 492 itself and serves as the gear's thrust surface under load where each of the planet bevel gears 492 and the axle bevel gears 494 tend to push out axially, expanding the quadrilateral engagement pattern. Opening 491b accepts the proximal ends 482a of the axles 482L, 482R which provide rotational support for bull gear 491. A pair of recesses 491c disposed about opening 491b on the opposing faces of bull gear 491 provide accommodation in the differential stack-up for a radial protrusion 494a formed on the face of the axle bevel gears 494 to ensure retention of a C-clip 489 that retains axle bevel gear 494 on its respective axle 482L, 482R.

Figure 25:
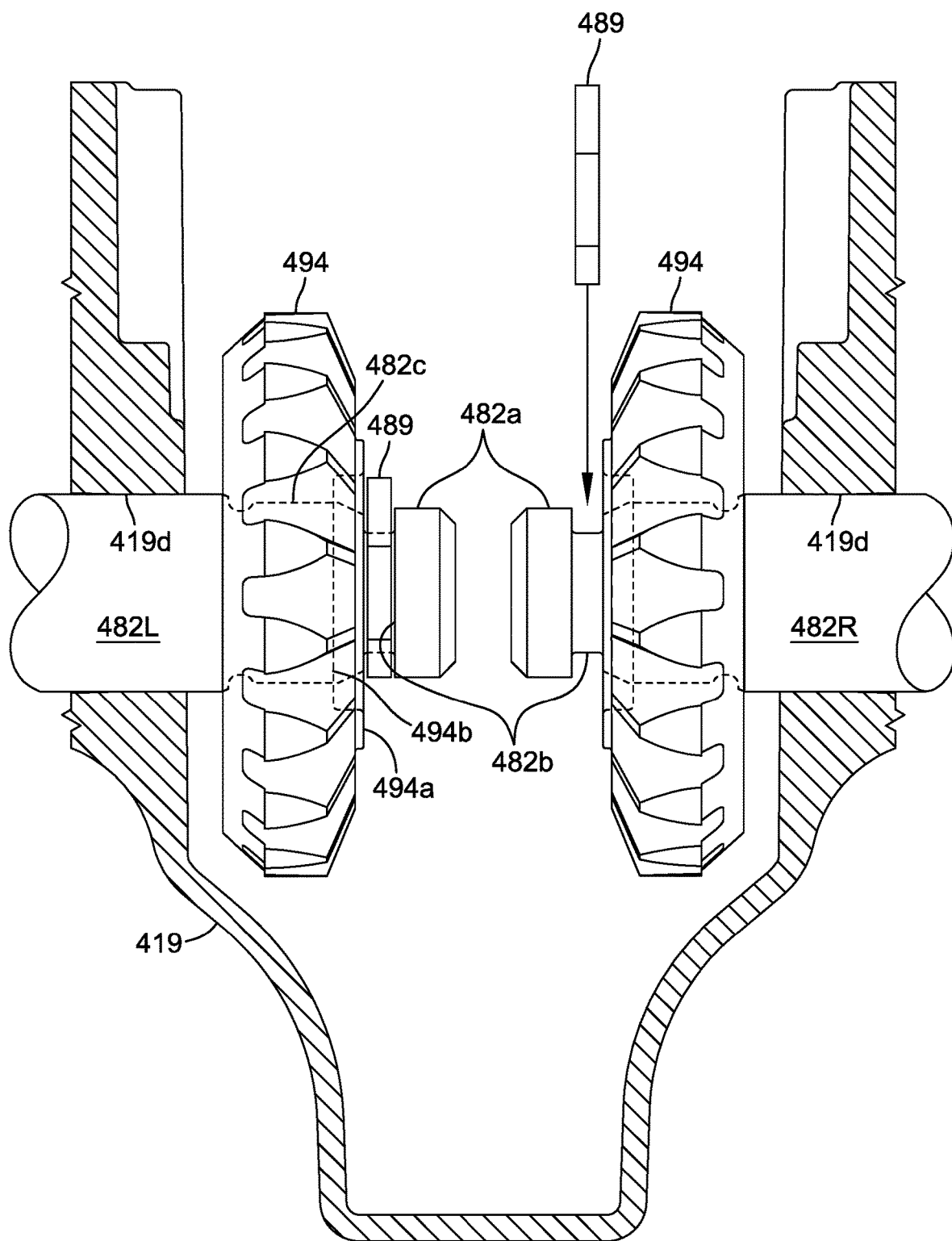
FIG. 25 is a partially-exploded, elevational view of the differential assembly of FIG. 23, with certain components removed and the housing shown cut away for clarity.
Figure 26:
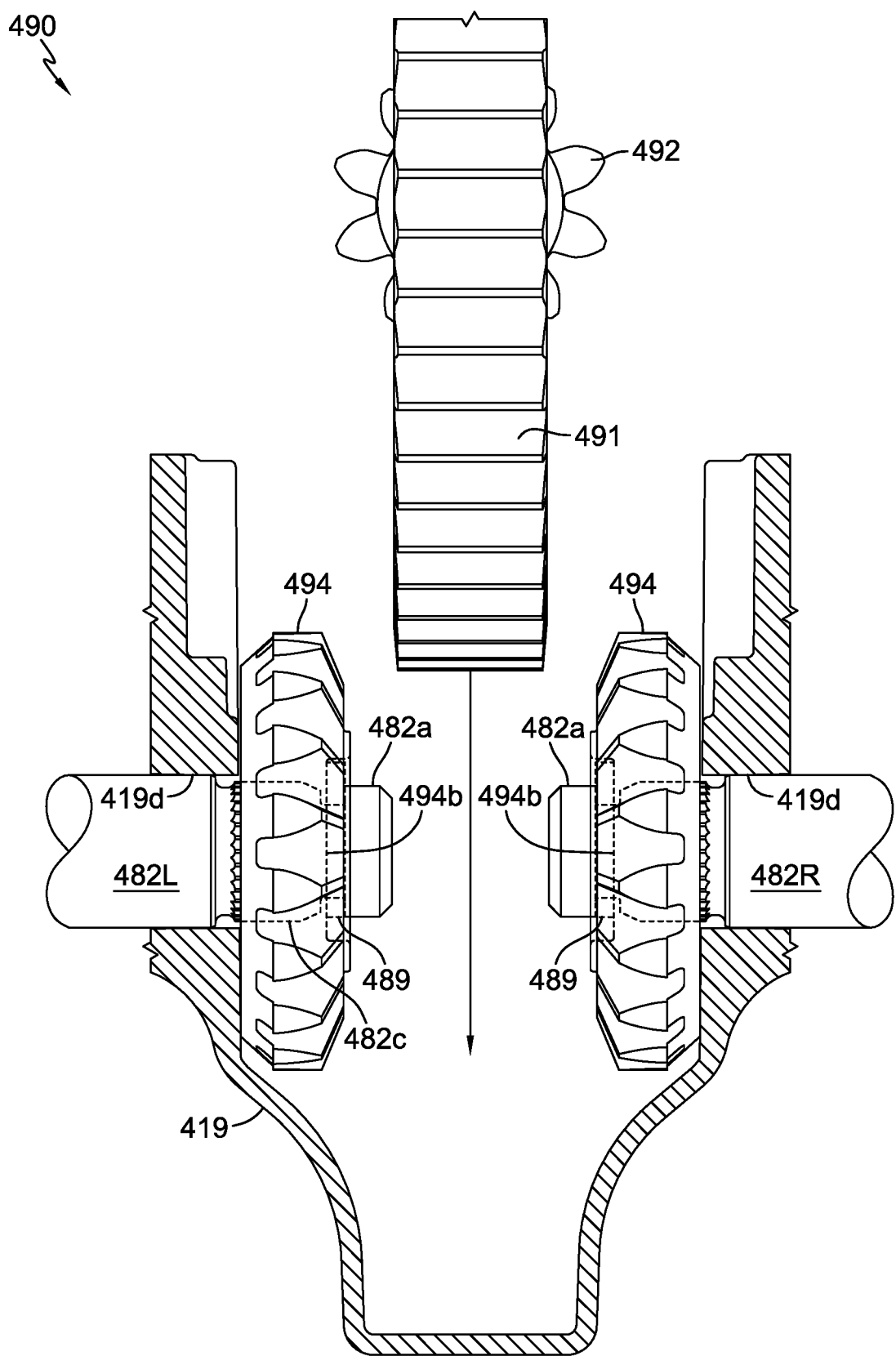
FIG. 26 is another partially-exploded, elevational view of the differential assembly of FIG. 23, with certain components removed and the housing shown cut away for clarity.
Figure 27:
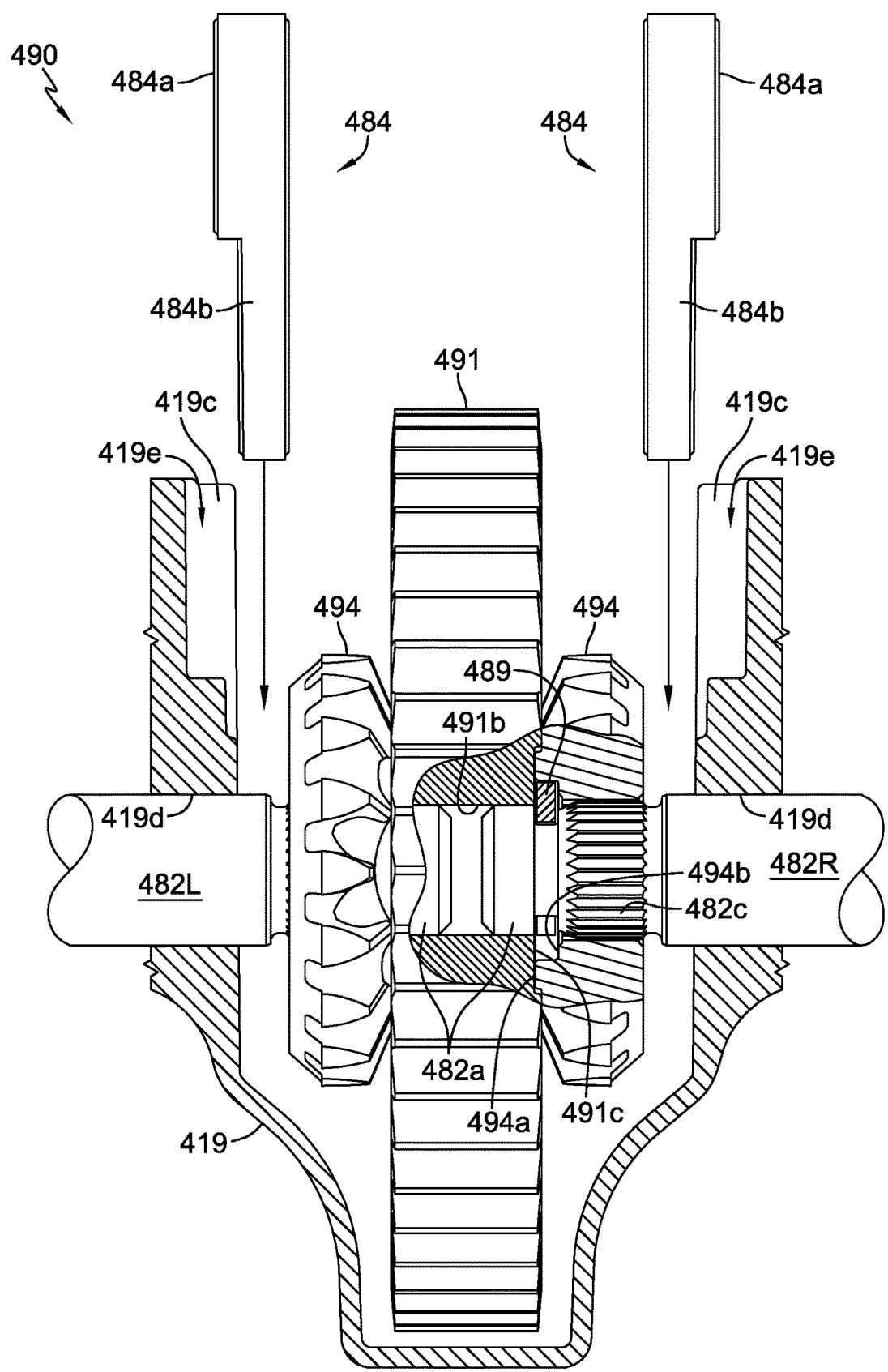
FIG. 27 is another partially-exploded, elevational view of the differential assembly of FIG. 23, with certain components removed and other components shown cut away for clarity.

FIGS. 25 through 27 depict the sequencing of assembly for differential assembly 490. Each axle 482L, 482R is rotationally supported near its proximal end 482a by a rotational support opening 419d formed in main housing 419. An optional bushing (not shown) may line rotational support opening 419d, depending on vehicle application. Adjacent to the proximal end 482a of each axle 482L, 482R is a C-clip retaining groove 482b and a set of splines 482c adapted to engage a corresponding set of splines formed on the interior of axle bevel gear 494. Axle bevel gear 494 is first slipped onto splines 482c, after which C-clip 489 is inserted in C-clip retaining groove 482b. Axles 482L, 482R are moved outboard until each axle bevel gear 494 encounters an inner wall of main housing 419 adjacent to rotational support openings 419d to provide space for insertion of bull gear 491 between axle bevel gears 494. This correspondingly locates C-clip 489 within a recess 494b formed in the face of axle bevel gear 494 about which radial protrusion 494a is disposed, further ensuring that C-clip 489 will not become dislodged from C-clip retaining groove 482b. Next, bull gear 491, with planet bevel gears 492 and pins 493 installed, is inserted between axle bevel gears 494. Axles 482L, 482R are then moved inboard to produce a gear mesh between planet bevel gears 492 and axle bevel gears 494. Correspondingly, the radial protrusions 494a of each axle bevel gear 494L, 494R are located within the corresponding recesses 491c formed on the opposing faces of bull gear 491, but with appropriate tolerances, do not physically engage the recesses 491c. As shown in FIG. 27, the proximal ends 482a of axles 482L, 482R now reside within bull gear opening 491b, to provide rotation support for bull gear 491 during differential operation. A pair of axle spacers 484 are then inserted between axle bevel gears 494 and main housing 419 to set the stack-up of differential assembly components. Each axle spacer 484 has a yoke 484b disposed about its respective axle 482L, 482R and a protrusion 484a that is captured in an anti-rotation slot 419e between a pair of axle spacer retention ribs 419c. Each axle spacer yoke 484b also serves as a thrust surface for its respective axle bevel gear 494 upon installation.

During straight-line operation of a vehicle equipped with transaxle 420 and differential assembly 490, each axle 482L, 482R is rotated at the same rate as bull gear 491 transfers rotational energy from reduction gear set 480 to each axle 482L, 482R through the stack-up of planet bevel gears 492 and axle bevel gears 494, where each axle bevel gear 494 turns at the same rotational rate as bull gear 491. As a vehicle proceeds through a turn, the one of the axles making the larger radius turn will rotate at a greater rotational rate than bull gear 491, while the other of the axles making the smaller radius turn will rotate at a rate less than that of bull gear 491.

While one or more specific embodiments of the invention have been described in detail, it will be appreciated by those skilled in the art that various modifications, combinations of disclosed elements, and alternatives to those details could be developed in light of the overall teachings of the disclosure. Accordingly, the particular arrangements disclosed are meant to be illustrative only and not limiting as to the scope of the invention which is to be given the full breadth of any appended claims and any equivalent thereof.

What is claimed is:

1. A hydraulic drive apparatus, comprising:
   a housing forming an internal sump for containing hydraulic fluid;
   a hydraulic drive mechanism disposed in the internal sump, the hydraulic drive mechanism comprising a mounting member having a first surface on which at least one rotating hydraulic cylinder block is disposed;
   hydraulic porting formed in the mounting member and in communication with the at least one rotating hydraulic cylinder block;
   a pair of check valve ports connected to the hydraulic porting to permit hydraulic communication between the internal sump and the hydraulic porting;
   a filter housing connected to the mounting member, the filter housing comprising:
     a first external filter surface adjacent the mounting member, and a second external filter surface, opposite the first external filter surface;
     a pair of openings formed in the first external filter surface, and a pair of deformable lips on the first external filter surface, each of the pair of deformable lips surrounding one of the pair of openings; and
     a filter screen to permit filtered hydraulic fluid to enter the filter housing from the internal sump;
   a pair of check valves, each disposed in one of the pair of check valve ports, and each of the pair of check valves comprising a valve body having a first end having an external surface, and a second end, and a passage extending through the valve body from the first end to the second end,
   wherein the external surface of each of the pair of check valves is engaged to the deformable lip of one of the pair of openings, such that each deformable lip sealingly engages the external surface of the respective valve body to the filter housing and each of the pair of check valves is disposed entirely outside the filter housing.

2. The hydraulic drive apparatus of claim 1, wherein the filter screen is disposed on the first external filter surface, and adjacent to the mounting member.

3. The hydraulic drive apparatus of claim 1, wherein the mounting member comprises a center section having the first surface forming a first running surface for a hydraulic pump, and a second running surface for a hydraulic motor, and the hydraulic porting connects the first running surface to the second running surface.

4. The hydraulic drive apparatus of claim 1, further comprising a threaded fastener extending through the filter housing and into the mounting member to connect the filter housing to the mounting member.

5. The hydraulic drive apparatus of claim 1, further comprising a magnet disposed in a magnet pocket formed in the filter housing.

6. The hydraulic drive apparatus of claim 1, wherein the filter housing further comprises a filter base forming the first external filter surface, and connected to a filter cover forming the second external filter surface, and wherein the filter screen is located in the filter base and the filter cover does not permit fluid flow therethrough.

7. The hydraulic drive apparatus of claim 1, wherein each of the pair of check valves further comprises:
   a cage portion attached to the valve body and a check ball disposed in the cage portion, the cage portion comprising a first cage member adjacent to the valve body and a second cage member spaced from the first cage member; and
   a plurality of flexible ribs extending from the first cage member to the second cage member and forming a ball area in which the check ball is retained, wherein the plurality of flexible ribs are each composed of a flexible material which permits the check ball to be inserted into the ball area during assembly and to be retained therein after assembly.

8. The hydraulic drive apparatus of claim 7, wherein each of the pair of check valves further comprises an error proofing tab extending from the second cage member away from the ball area to prevent improper installation of the cage portion on the valve body.

9. A hydraulic drive apparatus, comprising:
   a housing forming an internal sump for containing hydraulic fluid;
   a hydraulic drive mechanism disposed in the internal sump, the hydraulic drive mechanism comprising a mounting member having a first surface on which at least one rotating hydraulic cylinder block is disposed;
   hydraulic porting formed in the mounting member and in communication with the at least one rotating hydraulic cylinder block;
   a plurality of check valve ports connected to the hydraulic porting to permit hydraulic communication between the internal sump and the hydraulic porting;
   a filter housing connected to the mounting member, the filter housing comprising:
      a first filter housing member disposed adjacent to the mounting member;
      a second filter housing member connected to the first filter housing member to form the filter housing, wherein the second filter housing member is formed as a solid cover to prevent fluid transmission therethrough;
      a plurality of check valve openings formed in the first filter housing member; and
      a filter screen disposed in the first filter housing member to permit filtered hydraulic fluid to enter the filter housing from the internal sump, wherein the filter screen is disposed adjacent to the mounting member; and
   a plurality of check valves, each disposed in one of the plurality of check valve ports, and each of the plurality of check valves comprising a valve body having a first end and a second end, and a passage extending through the valve body from the first end to the second end, wherein the first end of each of the plurality of check valves is engaged to an external surface of the filter housing adjacent to one of the plurality of check valve openings when the filter housing is connected to the mounting member, whereby each of the check valves are located entirely external of the filter housing.

10. The hydraulic drive apparatus of claim 9, wherein each of the plurality of check valves further comprises:
    a cage attached to the valve body and a check ball disposed in the cage, the cage comprising a first cage member adjacent to the valve body and a second cage member spaced from the first cage member; and
    a plurality of flexible ribs extending from the first cage member to the second cage member and forming a ball area in which the check ball is retained, wherein the plurality of flexible ribs are each composed of a flexible material which permits the check ball to be inserted into the ball area during assembly and to be retained therein after assembly.

11. The hydraulic drive apparatus of claim 10, wherein the mounting member comprises a center section having the first surface forming a first running surface for a hydraulic pump, and a second running surface for a hydraulic motor, and the hydraulic porting connects the first running surface to the second running surface.

12. The hydraulic drive apparatus of claim 11, further comprising a threaded fastener extending through the filter housing and into the mounting member to connect the filter housing to the mounting member.

13. The hydraulic drive apparatus of claim 11, further comprising a pair of filter locating pins on the first filter housing member to mate with filter pin locating pockets formed on the center section to properly align each of the plurality of check valve openings with one of the plurality of check valves.

14. A check valve for use in a hydraulic drive apparatus having hydraulic porting for connecting hydraulic components, the check valve comprising: a check ball disposed in a cage portion and engageable with a valve seat to close the check valve, the cage portion comprising a plurality of flexible ribs extending from a first end to a second end, and forming a ball area in which the check ball is retained, wherein the plurality of flexible ribs are each composed of glass filled nylon which permits the check ball to be inserted into the ball area during assembly and to be retained in the ball area after assembly.

15. The check valve of claim 14, further comprising a valve body having a first body end connected to a filter, a second body end having the valve seat and connected to the cage portion, and a passage extending through the valve body.

16. The check valve of claim 15, further comprising an error proofing tab extending from one end of the cage portion to prevent improper installation of the cage portion on the valve body.

17. A hydraulic drive apparatus, comprising:
    a housing forming an internal sump for containing hydraulic fluid;
    a hydraulic drive mechanism disposed in the internal sump, the hydraulic drive mechanism comprising a mounting member having a first surface on which at least one rotating hydraulic cylinder block is disposed and a pair of filter pin locating pockets formed on the mounting member;
    hydraulic porting formed in the mounting member and in communication with the at least one rotating hydraulic cylinder block;
    a plurality of check valve ports connected to the hydraulic porting to permit hydraulic communication between the internal sump and the hydraulic porting;
    a filter housing connected to the mounting member, the filter housing comprising:
       a first filter housing member disposed adjacent to the mounting member;

a second filter housing member connected to the first filter housing member to form the filter housing, wherein the second filter housing member is formed as a solid cover to prevent fluid transmission therethrough;

a plurality of check valve openings formed in the first filter housing member; and a filter screen disposed in the first filter housing member to permit filtered hydraulic fluid to enter the filter housing from the internal sump, wherein the filter screen is disposed adjacent to the mounting member;

a plurality of check valves, each disposed in one of the plurality of check valve ports, and each of the plurality of check valves comprising a valve body having a first end and a second end, and a passage extending through the valve body from the first end to the second end, wherein the first end of each of the plurality of check valves is engaged to one of the plurality of check valve openings when the filter housing is connected to the mounting member; and a pair of filter locating pins on the first filter housing member, each filter locating pin configured to mate with one of the pair of filter pin locating pockets to properly align each of the plurality of check valve openings with one of the plurality of check valves.

18. The hydraulic drive apparatus of claim 17, wherein the mounting member comprises a center section having the first surface forming a first running surface for a hydraulic pump, and a second running surface for a hydraulic motor, and the hydraulic porting connects the first running surface to the second running surface.

19. The hydraulic drive apparatus of claim 17, further comprising a threaded fastener extending through the filter housing and into the mounting member to connect the filter housing to the mounting member.

* * * * *